(12) United States Patent
Wold

(10) Patent No.: US 11,816,151 B2
(45) Date of Patent: Nov. 14, 2023

(54) MUSIC COVER IDENTIFICATION WITH LYRICS FOR SEARCH, COMPLIANCE, AND LICENSING

(71) Applicant: Audible Magic Corporation, Los Gatos, CA (US)

(72) Inventor: Erling Wold, San Francisco, CA (US)

(73) Assignee: Audible Magic Corporation, Los Gatos, CA (US)

( * ) Notice: Subject to any disclaimer, the term of this patent is extended or adjusted under 35 U.S.C. 154(b) by 434 days.

(21) Appl. No.: 16/875,927

(22) Filed: May 15, 2020

(65) Prior Publication Data

US 2021/0357451 A1    Nov. 18, 2021

(51) Int. Cl.
*G10L 15/02* (2006.01)
*G10L 15/187* (2013.01)
*G10L 15/32* (2013.01)
*G10L 25/90* (2013.01)
*G06F 16/683* (2019.01)

(52) U.S. Cl.
CPC .......... *G06F 16/685* (2019.01); *G10L 15/02* (2013.01); *G10L 15/187* (2013.01); *G10L 15/32* (2013.01); *G10L 25/90* (2013.01); *G10L 2015/025* (2013.01)

(58) Field of Classification Search
CPC ....... G10L 15/02; G10L 15/187; G10L 15/32; G10L 25/90; G10L 2015/025; G06F 16/685
See application file for complete search history.

(56) References Cited

U.S. PATENT DOCUMENTS

| 5,918,223 A | 6/1999 | Blum et al. |
| 6,834,308 B1 | 12/2004 | Kezoye et al. |
| 6,968,337 B2 | 11/2005 | Wold |
| 7,043,473 B1 | 5/2006 | Rassool et al. |

(Continued)

FOREIGN PATENT DOCUMENTS

| CN | 103885949 A | * 6/2014 | ....... G06F 17/30746 |
| CN | 110717062 A |   1/2020 | |

(Continued)

OTHER PUBLICATIONS

Kruspe, et al., Retrieval of Sung Lyrics from Sung Queries, 2018, IEEE, whoel document (Year: 2018).*

(Continued)

*Primary Examiner* — Sonia L Gay
(74) *Attorney, Agent, or Firm* — Lowenstein Sandler LLP

(57) ABSTRACT

Embodiments cover identifying an unidentified media content item as a cover of a known media content item using lyrical contents. In an example, a processing device receives an unidentified media content item and determines lyrical content associated with the unidentified media content item. The processing device then determines a lyrical similarity between the lyrical content associated with the unidentified media content item and additional lyrical content associated with a known media content item of a plurality of known media content items. The processing device then identifies the unidentified media content item as a cover of the known media content item based at least in part on the lyrical similarity, resulting in an identified cover-media content item.

22 Claims, 18 Drawing Sheets

(56) References Cited

U.S. PATENT DOCUMENTS

| | | |
|---|---|---|
| 7,363,278 B2 | 4/2008 | Schmelzer et al. |
| 7,562,012 B1 | 7/2009 | Wold et al. |
| 8,006,314 B2 | 8/2011 | Wold |
| 8,130,746 B2 | 3/2012 | Schrempp |
| 8,199,651 B1 | 6/2012 | Schrempp et al. |
| 8,332,326 B2 | 12/2012 | Schrempp et al. |
| 8,965,766 B1 | 2/2015 | Weinstein et al. |
| 8,972,481 B2 | 3/2015 | Schrempp et al. |
| 9,081,778 B2 | 7/2015 | Garside et al. |
| 9,507,860 B1* | 11/2016 | Oztaskent ............. G06F 16/951 |
| 2003/0023421 A1 | 1/2003 | Finn et al. |
| 2004/0131255 A1 | 7/2004 | Ben-Yaacov et al. |
| 2007/0276733 A1* | 11/2007 | Geshwind ............. G06Q 30/02 705/14.49 |
| 2007/0282860 A1* | 12/2007 | Athineos ................. G10L 25/48 |
| 2008/0147826 A1* | 6/2008 | Velusamy ........... H04L 65/1059 709/219 |
| 2009/0037975 A1 | 2/2009 | Ishikawa et al. |
| 2009/0228510 A1 | 9/2009 | Slaney |
| 2009/0281995 A1 | 11/2009 | Mousavi et al. |
| 2012/0246584 A1 | 9/2012 | Beroukhim et al. |
| 2013/0091167 A1 | 4/2013 | Bertin-Mahieux et al. |
| 2013/0226957 A1* | 8/2013 | Ellis ...................... G06F 16/634 707/769 |
| 2014/0040980 A1 | 2/2014 | King et al. |
| 2017/0024441 A1* | 1/2017 | Hedgecock ............ H04H 60/58 |
| 2017/0075992 A1 | 3/2017 | Oztaskent et al. |
| 2017/0109504 A1* | 4/2017 | Ochmanek .............. G06F 16/22 |
| 2017/0185675 A1 | 6/2017 | Arngren |
| 2018/0189390 A1 | 7/2018 | Cremer et al. |
| 2018/0211650 A1 | 7/2018 | Knudson et al. |
| 2019/0205467 A1* | 7/2019 | Wold .................... G06F 16/686 |

FOREIGN PATENT DOCUMENTS

| | | |
|---|---|---|
| EP | 3508986 A1 | 7/2019 |
| WO | 03088534 A1 | 10/2003 |

OTHER PUBLICATIONS

Chen et al., "Fusing similarity functions for cover song identification," Multimedia Tools and Applications, Feb. 9, 2017, 24 pages.

Chen et al., "Content Identification in Consumer Applications", In 2009 IEEE International Conference on Multimedia and Expo, pp. 1536-1539. IEEE, 2009. (Year: 2009).

Ellis, Daniel P.W., "Beat tracking by dynamic programming," Journal of New Music Research, Jul. 16, 2007, 21 pages.

Ellis et al., "Identifying 'Cover Songs' with Chroma Features and Dynamic Programming Beat Tracking," IEEE International Conference on Acoustics, Speech and Signal Processing, Apr. 20, 2007, 16 pages.

Ravuri et al., "Cover Song Detection: From High Scores to General Classification," IEEE International Conference on Acoustics, Speech and Signal Processing, Apr. 2010, 5 pages.

Serra et al., "Audio cover song identification and similarity: background, approaches, evaluation, and beyond," Advances in Music Information Retrieval (2010) 274, pp. 307-332.

Serra et al., "Chroma Binary Similarity and Local Alignment Applied to Cover Song Identification," Advances in Music Information Retrieval (2010) 274, pp. 307-332.

Serra et al., "Transposing Chroma Representations to a Common Key," IEEE CS Conference on The Use of Symbols to Represent Music and Multimedia Objects (2008), 4 pages.

Tralie et al., "Cover Song Identification with Timbral Shape Sequences," 16th International Society for Music Information Retrieval, Jul. 21, 2015, pp. 38-44.

Tralie, Christopher J., "Early MFCC and HPCP Fusion for Robust Cover Song Identification," 18th International Society for Music Information Retrieval (2017), 11 pages.

Wang et al., "Similarity network fusion for aggregating data types on a genomic scale," Nature America, Inc., vol. 11, No. 3, Mar. 2014, pp. 333-337.

Casey, M. A. et al., "Content-Based Music Information Retrieval: Current Directions and Future Challenges", Proceedings of the IEEE, vol. 96, No. 4, Apr. 1, 2008, pp. 668-696, New York, US.

Nanopoulos A. et al., "Music Search Engines: Specificaitons and Challenges", Information Processing & Management, vol. 45, No. 3, May 1, 2009, Elsevier, Barking, GB, pp. 392-396.

Ning Chen et al., "Two-Layer Similarity Fusion Model for Cover Song Identification", Eurasip Journal on Audio, Speech, and Music Processing, vol. 2017, No. 1, May 22, 2017, Biomed Central Ltd., London, UK, pp. 1-15.

Osmalskyj, J. et al., "Efficient Database Pruning for Large-Scale Cover Song Recognition", International Workshop on Acoustic Signal Enhancement 2012, Institute of Electrical and Electronics Engineers, May 26, 2013, Piscataway, NJ, pp. 714-718.

PCT Notification of Transmittal of The International Search Report and The Written Opinion of The International Searching Authority for PCT Application No. PCT/US2021/032589 dated Sep. 22, 2021, 16 pages.

Rafii, "Live Music Recognition at Gracenote", Feb. 23, 2017, retrieved from the internet on Nov. 16, 2020, 8 pages URL:https://www.gracenote.com/live-music-recognition-gracenote/.

EP Communication for EP Patent Application No. 19 150 049.5, dated Nov. 20, 2020, 9 pages.

\* cited by examiner

MUSIC COVER IDENTIFICATION WITH LYRICS FOR SEARCH, COMPLIANCE, AND LICENSING

TECHNICAL FIELD

This disclosure relates to the field of media content identification, and in particular to identifying media content items as covers of original works using lyrical content.

BACKGROUND

A large and growing population of users enjoy entertainment through the consumption of media content items, including electronic media, such as digital audio and video, images, documents, newspapers, podcasts, etc. Media content sharing platforms provide media content items to consumers through a variety of means. Users of the media content sharing platform may upload media content items (e.g., user generated content) for the enjoyment of the other users. Some users upload cover versions of a known work of a content owner to the media content sharing platform without prior authorization. A cover version or cover is a new performance or recording of a previously performed or recorded musical composition. A content owner seeking to identify unauthorized uploads of cover versions of their protected, known works will generally have to review media content items to determine covers of their works. The process of evaluating each and every media content item uploaded by users or evaluating the entire available content of a media content supplier (e.g., a media content sharing platform) to identify potential cover versions of known works is time consuming and requires a substantial investment into computing/processing power and communication bandwidth.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
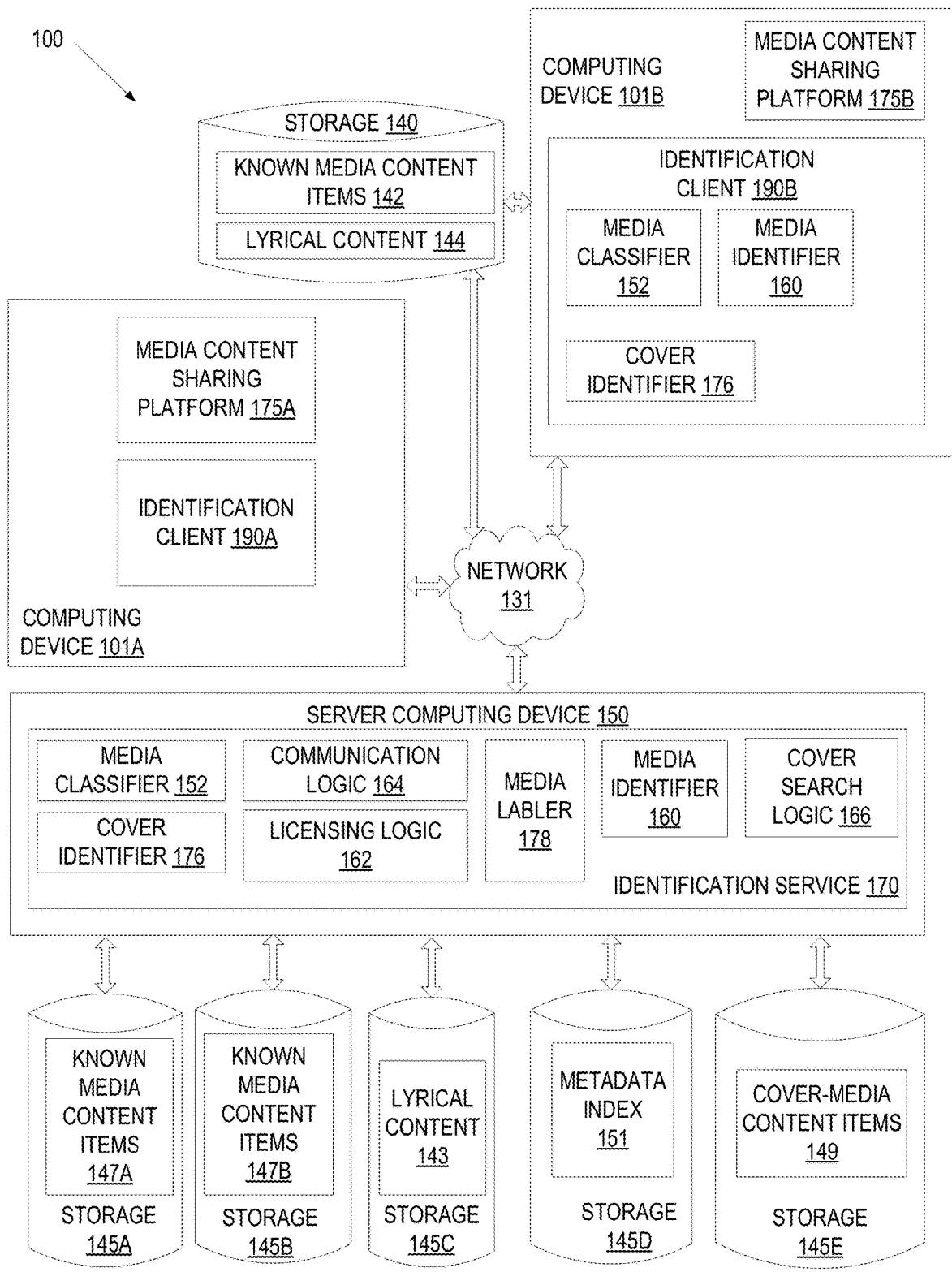
FIG. 1 is a block diagram illustrating a network environment in which embodiments of the present disclosure may operate.

Embodiments are described for identifying media content items, and in particular for identifying covers of media content items based at least in part on lyrical content of those media content items, where lyrical content is or includes one or more words that are lyrics of a musical composition. In embodiments, lyrical content is identified in unidentified media content items, and the lyrical content is used either alone or together with additional features (e.g., musical features such as pitch, audio cepstrum, etc.) to detect cover versions of compositions which include sung lyrics and/or spoken words (e.g., songs, rap compositions, hip-hop compositions, etc.). The lyrical content is used as an identifying feature that greatly improves the accuracy of cover identification.

A media content item may be audio (e.g., a song or album), a video, or some other recording (e.g., a work) that contains an audio portion. Media content items may be files (e.g., audio files having formats such as WAV, AIFF, AU, FLAC, ALAC, MPEG-4, MP3, Opus, Vorbis, AAC, ATRAC, WMA, and so on, or video files having formats such as WebM, Flash Video, F4V, Vob, Ogg, Dirac, AVI, QuickTime File Format, Windows Media Video, MPEG-4, MPEG-1, MPEG-2, M4V, SVI, MP4, FLV, and so on). Media content items may also be live streams of video and/or audio media. A media content item that is a cover (e.g., a cover song) is a new performance or recording of a previously performed or recorded musical composition, herein referred to as a cover-media content item.

In embodiments, unidentified media content items are identified as cover-media content items by comparing a set of extracted features from the unidentified media content item to known features for media content items of known works, where the set of extracted features includes lyrical content. Based upon the identified cover-media content item and the known work associated with the cover-media content item, licensing rates may be determined, covers may be removed from servers, and so on. The cover-media content item may be added to a cover-media repository, and may later be searched on a cover-media search repository.

High quality lyrics databases may be used, and so known media items may not need to be analyzed in order to determine their lyrical content. However, in some embodiments the known media content items are analyzed to determine timing information associated with the lyrics. Because high quality lyrics databases are available, there are no or minimal errors in the lyrics of the known media items, and errors only occur for the lyrical content of the unidentified media content items. Since lyrics are a comparatively small amount of information (e.g., as compared to the audio content), lyrical extraction and lookup/comparison may be performed with minimal network bandwidth and processor utilization. In embodiments where lyrical similarity is determined first, and where further analysis (e.g., of pitch and/or sonic features) is only performed if there is sufficient lyrical similarity found between an unidentified media content item and a known media content item, significant savings in network bandwidth utilization (e.g., in a remote lookup) and a significant savings in computation are achieved. For example, in the case where the system doesn't care about matching instrumental compositions or instrumental covers, significant savings in network utilization and computation may be achieved by determining that there is no lyrical overlap and stopping further analysis. Use of lyrical content in addition to musical features for identifying covers also reduces an overall false positive rate and thus increases a hit rate in such identification. For example, a determination that an unidentified media content item is a cover of a song may be made with increased accuracy by using both lyrical content and musical/audio content because a match is made for harmony and melody as well as lyrics.

Today many pieces of content are available to be viewed both offline and online through a diverse collection of media content sharing platforms. In one common case, a media content sharing platform will monetize an instance of media content during the presentation of the content to the end user. Monetization of media content includes displaying other content such as advertisements and/or promotional media alongside, before, or after presenting the media content item. Interested parties, such as a content sharing platform, a user uploading a media content item, a media content item owner, or a media content item publisher may wish to determine whether the media content item is a cover-media content item of a known work so that licensing rates may be applied for the cover-media content item and/or the cover-media content item may be removed from the media content sharing platform. A media content identification service may receive the unidentified media content item for processing locally or remotely over a network.

Popularity of media content sharing platforms is ever increasing. The user bases for popular media content sharing platforms have already expanded to over a billion users. An active set of these users is uploading user generated content. User generated content (UGC) may include a cover of the work of another that is subject to copyright protections (e.g., video or audio known works). Every new instance of user generated content generally should be analyzed for copyright compliance against existing known works that have been registered for protection. A media content identification service can receive billions of transactions each and every month, where each transaction involves the analysis of a media content item.

Traditional identification services may match digital fingerprints of the user generated content to registered known works when the user generated content is either an exact match or near match to the digital fingerprint of a registered known work. However cover-media content items in many cases are contemporary versions of original works where a modification to the tempo, musical arrangement, or other audio features has been made. As a result, traditional identification services are not generally capable of identifying covers of works (e.g., matching cover-media content items to their associated original work). Embodiments of the present disclosure provide a cover identification service that determines whether new media content items include covers of works.

In an embodiment, a media content sharing platform (e.g., such as YouTube®, Vimeo®, Wistia®, Vidyard®, SproutVideo®, Daily Motion®, Facebook®, etc.) provides an unidentified media content item, which has been uploaded by a user, to a media content identification service as input. The media content identification service determines lyrical content associated with the unidentified media content item. This determination may be made by processing the unidentified media content item (or at least an audio portion of the unidentified media content item) using a machine learning model (or set of machine learning models) that has been trained to transcribe audio into sequences of words and/or phonemes. For example, the unidentified media content item may be processed using an automated speech recognition (ASR) system. Processing logic then compares the lyrical content of the unidentified media content item to lyrical content of known works (i.e., lyrical content of known songs, performances, etc.). The processing logic determines lyrical similarities between the lyrical content associated with the unidentified media content item and additional lyrical content associated with a plurality of known media content items. The processing logic may determine that the unidentified media content item is a cover of a known media content item based on the lyrical similarity between the unidentified media content item and the known media content item, resulting in an identified cover-media content item.

In some embodiments, processing logic determines whether to perform further analysis regarding the similarity between the unknown media content item and one or more known media content items based on lyrical similarities between the unknown media content item and those one or more known media content items. In one embodiment, further analysis is performed regarding the similarity between the unidentified media content item and a known media content item if the lyrical similarity between the two meets or exceeds a threshold. In another embodiment, further analysis is performed between the unidentified media content item and multiple known media content items if no lyrical similarities were determined that meet or exceed a lyrical similarity threshold. Further analysis between the unidentified media content item and a known media content item may include generating a digital fingerprint of the unidentified media content item (e.g., extracting features of the unidentified media content item), and comparing the digital fingerprint (or portions thereof) to digital fingerprints (or portions thereof) of known media content items to determine similarities therebetween. A combination of the lyrical similarity and additional similarities (e.g., a musical similarity and/or an audio similarity) may be used to determine whether the unidentified media content item is a cover of a known media content item.

In some embodiments, in addition to determining the lyrical similarities between the unidentified media content item and known media content items, additional similarities are also determined therebetween. For example, processing logic may generate a digital fingerprint of the unidentified media content item by extracting one or more features or vectors from the unidentified media content item. These features or vectors may represent musical features such as pitch, timbre, rhythm, and so on. Such features (e.g., the digital fingerprint containing such features or portions of the digital fingerprint containing such features) may be compared to similar features extracted from known media content items, and one or more additional similarities (e.g., a musical similarity) may be determined based on the comparison. A combined similarity value or similarity score may be generated based on a combination of the lyrical similarity and the one or more additional similarities. The combined similarity value or score may represent a degree of similarity between the unidentified media content item and a known media content item. This combined similarity value may be used to determine whether the unidentified media content item is a cover of the known media content item. For example, combined similarity values that meet or exceed a threshold may indicate that the unidentified media content item is a cover of a known media content item.

In addition to determining a lyrical similarity and a musical and/or audio similarity between an unidentified media content item and a known media content item, processing logic (e.g., a media content identification service) may determine a metadata similarity between the unidentified media content item and the known media content item. The metadata of a media content item may be or include a description of the media content item (e.g., tags attached to the media content item, a file name of the media content item, and/or other information describing the media content item). Such metadata may include data such as a name of a performer, a name of a band, a name of a song, a length of the media content item, information identifying the media content item as a cover of another song or album, and so on. Processing logic may determine metadata associated with the unidentified media content item, and may determine a metadata similarity between the metadata of the unidentified media content item and additional metadata associated with a known media content item of a plurality of media content items from a media content repository. The metadata similarity may be used together with the lyrical similarity and/or one or more additional similarities to determine whether the unidentified media content item is a cover of a known media content item.

In an embodiment, the media content identification service may further update the metadata of the unidentified media content item to include cover information that identifies the unidentified media content item as a cover of the known media content item once the unidentified media content item has been identified as a cover of the known media content item.

Performing speech recognition of musical works (e.g., songs, musical recordings, etc.) is particularly difficult because sung language is generally different from spoken language. Additionally, musical works often have considerable background noise (i.e., the instrumental music accompanying the singing). Accordingly, heretofore attempts to perform speech recognition on musical works has been met with limited success. However, through experimentation it was discovered that even a low quality transcription of the lyrics of an unidentified media content item containing music using machine learning can be very useful in identifying such an unidentified media content item as a cover by determining the lyrical similarity between the unidentified media content item and known media content items (which have well defined lyrics). This is particularly true when the lyrical similarity is combined with other similarity metrics between the unidentified media content item and the known media content item. Combining the lyrical similarity along with additional similarity values (e.g., for timbre, rhythm, pitch, metadata, etc.) can result in combined similarity metrics that accurately identify covers of known media content items (e.g., of known musical works).

Additionally, the amount of processing to extract lyrics from an unidentified media content item and determine lyrical similarities between the unidentified media content item and known media content items is generally much lower than the amount of processing to extract musical features and make comparisons to known media content items based on the musical features. Accordingly, the amount of computation that is performed to identify an unidentified media content item as a cover of a known media content item can be significantly reduced by first determining lyrical similarities between the unidentified media content item and many known media content items, and then only performing further analysis with regards to those known media content items for which the lyrical similarity met or exceeded a threshold. Savings can include reduced time to perform comparisons and reduced processor cycles dedicated to determining similarities between the unidentified media content item and known media content items.

Accordingly, embodiments address the technical problem of how to identify whether an unidentified media content item is a cover of a known media content item. Additionally, embodiments address this technical problem with a technical solution that reduces processor utilization, reduces memory utilization and reduces time spent making comparisons between the unidentified media content item and known media content items. The technical solution in embodiments includes the use of machine learning to determine lyrical content of unidentified media content items, comparing the lyrical content to lyrical content of known media content items, extracting musical and/or audio features from the unidentified media content item, comparing the musical and/or audio features to musical and/or audio features of known media content items, and optionally comparing metadata of the unidentified media content item to metadata of known media content items. Multiple similarity values may be determined, and cross-similarity matrices for each of the types of similarities may be generated and combined using similarity network fusion. Embodiments provide a high accuracy technique to identify unidentified media content items as covers of known media content items.

Turning now to the figures, FIG. 1 is a block diagram illustrating a network environment 100 in which embodiments of the present disclosure may operate. In one embodiment, network environment 100 includes one or more computing devices (e.g., computing device 101A, computing device 101B, and server computing device 150) connected via network 131. Any number of computing devices 101A-B can communicate with each other and/or with server computing device 150 through network 131. The network 131 can include a local area network (LAN), a wireless network, a telephone network, a mobile communications network, a wide area network (WAN) (e.g., such as the Internet) and/or similar communication system. The network 131 can include any number of networking and computing devices such as wired and wireless devices.

The computing devices 101A-B and server computing device 150 may include one or more physical machines and/or virtual machines hosted by physical machines. The physical machines may include rackmount servers, desktop computers, and/or other computing devices. In one embodiment, the computing devices 101A-B and/or server computing device 150 include a virtual machine managed and provided by a cloud service provider system. Each virtual machine offered by a cloud service provider may be hosted on a physical machine configured as part of a cloud. Such physical machines are often located in a data center. A cloud provider system and cloud may be provided as an infrastructure as a service (IaaS) layer. One example of such a cloud is Amazon's® Elastic Compute Cloud (EC2®).

Computing devices 101A-B each host a media content sharing platform 175A-B. Media content sharing platforms 175A-B receive and store user uploads of user generated content and other content. User generated content (UGC) includes any form of content, such as images, videos, texts and audio, that has been posted by users on media content sharing platforms (i.e. online platforms) such as social media and wikis. Such UGC may then be accessible to other users. User generated content includes media content items that have been uploaded to the media content sharing platform. Such media content items are unidentified media content items on upload, and may include copyrighted material in many instances.

The media content sharing platforms 175A-B may engage with a media content identification service 170 hosted by server computing device 150. After a media content item is uploaded to the media content sharing platform 175A-B, the computing device 101A, 101B may provide the media content item to the server computing device 150 for identification by identification service 170. The media content item may be provided to server computing device 150 as a single file or multiple files (e.g., as a portion of a larger file). Alternatively, one or more digital fingerprints (e.g., sets of features) of the media content item may be generated and provided to identification service 170. In one embodiment, a computing device 101A-B divides a media content item into multiple segments, and one or more segments (or a digital fingerprint of one or more segments) are sent to server computing device 150. Alternatively, a digital fingerprint of the media content item may be determined from the whole of the media content item and transmitted to the server computing device 150. In addition to sending one or more digital fingerprints of a media content item and/or one or more segments of the media content item, the media content sharing platform 175A-B may also send metadata associated with the media content item. Additionally, the media content sharing platform 175A-B may extract lyrical content from uploaded unidentified media content items, and may provide the lyrical content to identification service 170. The digital fingerprints (e.g., feature vectors or other sets of features), lyrical content and metadata are discussed in greater detail below.

In one embodiment, computing device 101A-B hosts a media content sharing platform 175A-B and may include local storage (not shown) for storing an Operating System (OS), programs, and/or specialized applications to be run on the computing device. Computing device 101A-B may further include storage for storing media content items of the media content sharing platform 175A. The media content items may also be stored in attached or remote storage, such as in a storage area network (SAN), a network attached storage (NAS), or a cloud storage platform (e.g., a storage as a service provided by a cloud service platform). In an example, computing device 101B is connected to remote storage 140.

In one embodiment, computing device 101A-B includes an identification client 190A-B that is configured to extract information from unidentified media content items and to send such extracted information to identification service and to otherwise communicate with identification service. Such extracted content may include lyrical content, one or more digital fingerprints, one or more features (e.g., feature vectors), and so on. Identification client 190A-B may alternatively or additionally be configured to send unidentified media content items or portions thereof to identification service 170. Additionally, or alternatively, the identification client may process unidentified media content items to determine whether those unidentified media content items contain music, and to perform additional operations and/or send data to identification service if the unidentified media content items contain music. Identification clients 190A-B may optionally include a media classifier 152, a media identifier 160 and/or a cover identifier 176 in embodiments.

Server computing device 150 includes a media content identification service 170 that can identify media content items. In an embodiment, the media content identification service 170 includes a media identifier 160, a cover search logic 166, licensing logic 162, communication logic 164, a media classifier 152, and a cover identifier 176. Alternatively, the identification service 170 may not include some of these components and/or the functionality of some of these components may be combined.

The server computing device 150 may communicate with storages 145A-E that store known media content items 147A-B, a metadata index of known media content items 151, lyrical content 143 of known media content items (e.g., a lyrical content repository, which may include an inverted index of at least one of sets of words or sets of phonemes generated from transcriptions of lyrical content associated with known media content items), and/or cover-media content items 149. The storages 145A-E can be magnetic storage units, optical storage units, solid state storage units, storage servers, or similar storage units. The storages 145A-E can be monolithic devices or a distributed set of devices. A 'set,' as used herein, refers to any positive whole number of items including one. In some embodiments, the storages 145A-E may part of a SAN, NAS or storage service. As shown, known media content items 147A, known media content items 147B, lyrical content 143, metadata 151 and cover-media items 149 are all stored in separate storage. However, it should be understood that the same storage may be used to store some or all of known media content items 147A, known media content items 147B, lyrical content 143, metadata 151 and cover-media items 149.

The known media content items 147A-B may be media content items that have a known classification and/or a known identification. Additionally, one or more digital fingerprints of the known media content items 147A-B may be stored in storages 145A-B. The digital fingerprints associated with a media content item may include first digital fingerprints generated using a first fingerprinting module (e.g., a fingerprinting module that generates digital fingerprints usable to identify an unknown media content item as a copy or same performance of a known media content item) and/or second digital fingerprints generated using a second fingerprinting module (e.g., a fingerprinting module that generates digital fingerprints usable to identify an unknown media content item as a cover or different performance of a known media content item). Licensing information about the known media content items 147A-B may also be stored. Metadata associated with the known media content items 147A-B may also be stored. In embodiments, metadata 151 is normalized text of metadata of known media content items 143, which may include an index of metadata (e.g., descriptive text) describing the known media content items 147A-B.

The cover-media content items 149 may be media content items that have been identified as cover versions of original works. As shown, cover-media content items 149 are stored separately from other known media content items 146A-B. However, cover-media content items 149 may alternatively be stored together with other known media content items 147A-B. Metadata describing attributes of the cover-media content items 149 and/or one or more digital fingerprints of the cover-media content items 149 may also be stored in storage 145E along with or as part of cover-media content items 149.

The lyrical content of known media content items 147A-B is generally well known. The lyrical content 143 of known media items may be stored in a manner in which it is associated with or linked to the appropriate known media content items whose lyrics it includes. In some embodiments, the lyrical content 143 includes timing information that indicates, for words and/or phonemes in the lyrical content 143, when (e.g., at what time offset) in the associated media content item the those words/phonemes are played.

The communication logic 164 may send and receive data associated with media content items to be identified. The data may be received from a remote computing device (e.g., a media content sharing platform 175A-B running on a remote computing device 101A-B).

In one embodiment, identification clients 190A-B run on the computing devices 101A-B of media content sharing platforms 175A-B. Identification clients 190A-B may be configured to generate a transaction request for an unidentified media content item that has been uploaded by a user of a media content sharing platform 175A-B. These identification clients 190A-B may be configured to determine unidentified media content items that have been uploaded to media content sharing platforms, extract information from those unidentified media content items (e.g., generate one or more digital fingerprints of the unidentified media content items), determine information about those unidentified media content items (e.g., determine lyrical content of the unidentified media content items, determine classifications of the unidentified media content items, determine metadata associated with the media content items, etc.), and send the unidentified media content items and/or the extracted/determined information associated with those unidentified media content items to identification service 170 along with the transaction request. Identification clients 190A-B may include communication logic (not shown) for communicating with the identification service 170 running on server computing device 150.

Digital fingerprints are compact digital representations of a media content item (or a segment of a media content item) extracted from a media content item (audio or video) which represent characteristics or features of the media content item with enough specificity to uniquely identify the media content item. Original media content items (e.g., known works) may be registered to the identification service 170, which may include generating a plurality of segments of the original media content item and generating first and/or second digital fingerprints for each of the plurality of segments. The first digital fingerprints may be usable for standard identification of copies, and the second digital fingerprints may be usable for cover identification. Fingerprinting algorithms encapsulate features such as frame snippets, motion and music changes, camera cuts, brightness level, object movements, loudness, pitch, brightness, spectral bandwidth, energy in one or more spectral bands, spectral steadiness, Mel-frequency cepstral coefficients (MFCCs), and so on. The fingerprinting algorithm that is used may be different for audio media content items and video media content items. Additionally, different fingerprinting algorithms may be used to generate digital fingerprints usable to identify a copy of a known work (referred to as first digital fingerprints herein) and to generate digital fingerprints usable to identify a cover of a known work (referred to as second digital fingerprints herein).

Data sent by the identification client 190A-B and received by the identification service 170 may be or include a transaction request for identifying an unidentified media content item and an entire media content item (e.g., an entire file), one or more segments of a media content item, a set of features of a media content item (e.g., one or more digital fingerprint of the media content item), a set of features of a segment of a media content item (e.g., one or more digital fingerprint of a segment of the media content item), lyrical contents of a media content item, a classification of the media content item (e.g., as containing or not containing music), and/or metadata associated with the media content item. In some embodiments, received data is stored in one or more of storages 145A-E.

In one embodiment, media classifier 152 classifies an unknown media content item as containing music or as not containing music. Additionally, media classifier 152 may determine different classifications for different portions of an unidentified media content item. For example, media classifier 152 may identify minutes 0-15 of an unidentified media content item as containing music and may further identify minutes 16-90 of the unidentified media content item as not containing music. Media classifier 152 may be further configured to determine additional classifications for unidentified media content items (or portions or segments thereof) that contain music. For example, media classifier 152 may classify unidentified media content items based on music genre (e.g., rock, punk, heavy metal, pop, R&B, and so on).

In one embodiment, media classifier 152 includes one or more trained machine learning models or profiles (e.g., trained convolutional neural networks) that have been trained to classify input media content items. In some embodiments the one or more trained machine learning models are trained to receive an audio file or a portion of an audio file as an input. In some embodiments, the trained machine learning models are trained to receive one or more embeddings generated from an audio portion of a media content item (e.g., of an audio file). In machine learning, an embedding refers to a projection of an input into another more convenient representation space. For example, a digital fingerprint and/or set of features of a media content item or of a portion of a media content item may be an embedding. The trained machine learning model may output, for each class that it has been trained to identify, a probability that the media content item (or portion of the media content item)

belongs to that class. For example, a trained machine learning model may output a first probability that the media content item contains music and a second probability that the media content item does not contain music. If a probability of a class exceeds a threshold, the media content item may be assigned to that class. In another example, for a media content item identified as containing music, it may be processed by a further media content item to determine the genre of music represented in the media content item.

In one embodiment, identification service does not perform further processing of media content items (or portions thereof) that do not contain music. If a media content item fails to contain music, then the identification service 170 may respond to the identification client 190A-B with a response to the transaction request indicating that there is no music contained in the unidentified media content item and/or that the unidentified media content item fails to include any copyrighted music.

Media identifier 160 is configured to determine matches or near matches between unidentified media content items and known media content items based on comparisons of digital fingerprints (e.g., of first digital fingerprints). When such a match or near match is made between an unidentified media content item and a known media content item, then it can be concluded that the unidentified media content item is an instance of the known media content item. When a match or near match is made between a) a portion of the unidentified media content item and all or a portion of a known media content item or b) an unidentified media content item and a portion of a known media content item, then it can be determined that the unidentified media content item contains at least a portion of the known media content item. In both instances, there may be licensing and/or take-down rules to implement.

In one embodiment, media identifier determines matches between unidentified media content items (or portions thereof) that contain music and known media content items. Alternatively, the operations of media classifier 152 may be skipped, and media identifier 160 may perform identification of an unidentified media content item responsive to any transaction requests from identification clients 190A-B without a classification having been performed on the unidentified media content item associated with the transaction request.

The media identifier 160 may be configured to determine whether a received media content item is a copy of a known media content item. The transaction request may have included a first digital fingerprint of the unidentified media content item (or multiple first digital fingerprints, each of a different segment of the unidentified media content item). Alternatively, the transaction request may have included a copy of the unidentified media content item without any digital fingerprints. If a first digital fingerprint (or multiple first digital fingerprints) was not included, then media identifier may generate such a first digital fingerprint (or multiple first digital fingerprints) from the received unidentified media content item.

The digital fingerprint (or multiple digital fingerprints) of the unknown media content item may be compared against the digital fingerprints of all known works registered with identification service 170. Digital fingerprints generated for a registered work are stored (optionally along with content metadata) in a repository such as a database. For example, digital fingerprints of known media content items 147A-B may be stored along with or in the place of the actual known media content items 147A-B.

Media identifier 160 compares the first digital fingerprints of the unknown media content item to stored first digital fingerprints of the known media content items 147A-B. Digital fingerprints can be compared and used to identify media content items even in cases of content modification, alteration, or obfuscation (e.g., compression, aspect ratio changes, re-sampling, change in color, dimensions, format, bitrates, equalization) or content degradation (e.g., distortion due to conversion, loss in quality, blurring, cropping, addition of background noise, etc.) in embodiments.

In one embodiment, the unidentified media content item is divided into a plurality of segments, and a respective first digital fingerprint is generated for each segment. This process may have been performed by identification client 190A-B. The segments may be overlapping or non-overlapping segments. The media identifier 160 compares each respective digital fingerprint to a plurality of stored digital fingerprints, wherein each of the plurality of stored digital fingerprints is associated with a respective known media content item of the known media content items 147A-B. The media identifier determines, based on the comparing, an amount of the first digital fingerprints of the unknown media content item that match digital fingerprints of a known media content item 147A-B. If a threshold of the first digital fingerprints of the unidentified media content item match first digital fingerprints of a known media content item, then a match can be determined. The identification service may then determine one or more actions to take with regards to the media content item that has been identified. For example, the media content item may be tagged as being the known work, advertising may be applied to the media content item and licensing revenues may be attributed to the owner of the rights to the known work (e.g., by licensing logic 162), the media content item may be removed from the media content sharing platform 175A-B, and so on.

If less than the threshold amount of the first digital fingerprints of the unidentified media content item match first digital fingerprints of any known media content item, then media identifier 160 fails to identify the unidentified media content item. That is to say, the unidentified media content item does not include a copy of any portion of any known media content item (e.g., of any known song in a music database).

Once a determination is made that an unidentified media content item (or portion thereof) cannot be identified by media identifier 160, cover identifier 176 may be invoked to determine whether the unidentified media content item is or contains a cover of a known media content item. The cover identifier 176 may determine whether the unidentified media content item is or contains a cover version of a known media content item or whether the unidentified media content item is an original work itself The transaction request may have included a second digital fingerprint of the unidentified media content item (or multiple second digital fingerprints, each of a different segment of the unidentified media content item). Alternatively, the transaction request may have included a copy of the unidentified media content item without any digital fingerprints. If a second digital fingerprint (or multiple second digital fingerprints) was not included, then cover identifier 176 may generate such a second digital fingerprint (or multiple second digital fingerprints) from the received unidentified media content item. Note that determining whether an unidentified media content item is a copy of a known media content item (or that a portion of an unidentified media content item is a copy of a portion of a known media content item) is a different process from determining whether the unidentified media content item is a cover of a known media content item, and is much more complex than determining whether an unidentified media content item contains a copy of any portion of a known media content item.

Generation of the second digital fingerprint(s) (which may be performed by identification client 190A-B or cover identifier 176) includes extracting one or more sets of audio features from the unidentified media content item. Generation of the second digital fingerprints may further include transforming the extracted audio features. The transformed set of audio features may make up one or more second digital fingerprints of the unidentified media content item. Cover identifier may compare these transformed sets of audio features of the second digital fingerprint(s) to second digital fingerprints of known media content items 147A-B to determine similarities therebetween.

The cover identifier 176 may also identify metadata from the unidentified media content item (or that was supplied with the transaction request) and perform a comparison to the metadata associated with known media content items (e.g., to the metadata index 151 of known media content items) in order to determine similarities between the metadata associated with the unidentified media content item and the metadata associated with known media content items 145A-B.

The cover identifier 176 may also determine lyrical content of the unidentified media content item. In one embodiment, the lyrical content is determined for the unidentified media content item by identification client 190A-B, and is provided with the transaction request. Alternatively, the lyrical content may be determined from the unidentified media content item by cover identifier 176. Cover identifier 176 then compares the lyrical content to lyrical content 143 of the known media content items 147A-B to determine a lyrical similarity therebetween.

In one embodiment, cover identifier 176 uses a combination of lyrical similarity between the lyrical content of the unidentified media content item and the lyrical content of a known media content item with one or more other similarity metrics to determine whether the unidentified media content item is or contains a cover of a known media content item. The additional similarity metrics may include a musical and/or audio similarity computed by comparing the second digital fingerprints of the unidentified media content to the second digital fingerprints of the known media content item and/or a metadata similarity computed by comparing the metadata of the unidentified media content item to the metadata of the known media content item. A combined similarity value or score may be computed and compared to a threshold. If the combined similarity value of score meets or exceeds the threshold, then cover identifier 176 may determine that the unidentified media content item is or contains a cover of the known media content item. On such a determination, the metadata of the unidentified media content item may be updated to identify it as a cover of the known media content item. Additionally, the now identified cover-media content item may be stored in storage 145E along with other cover-media content items 149.

Figure 2:
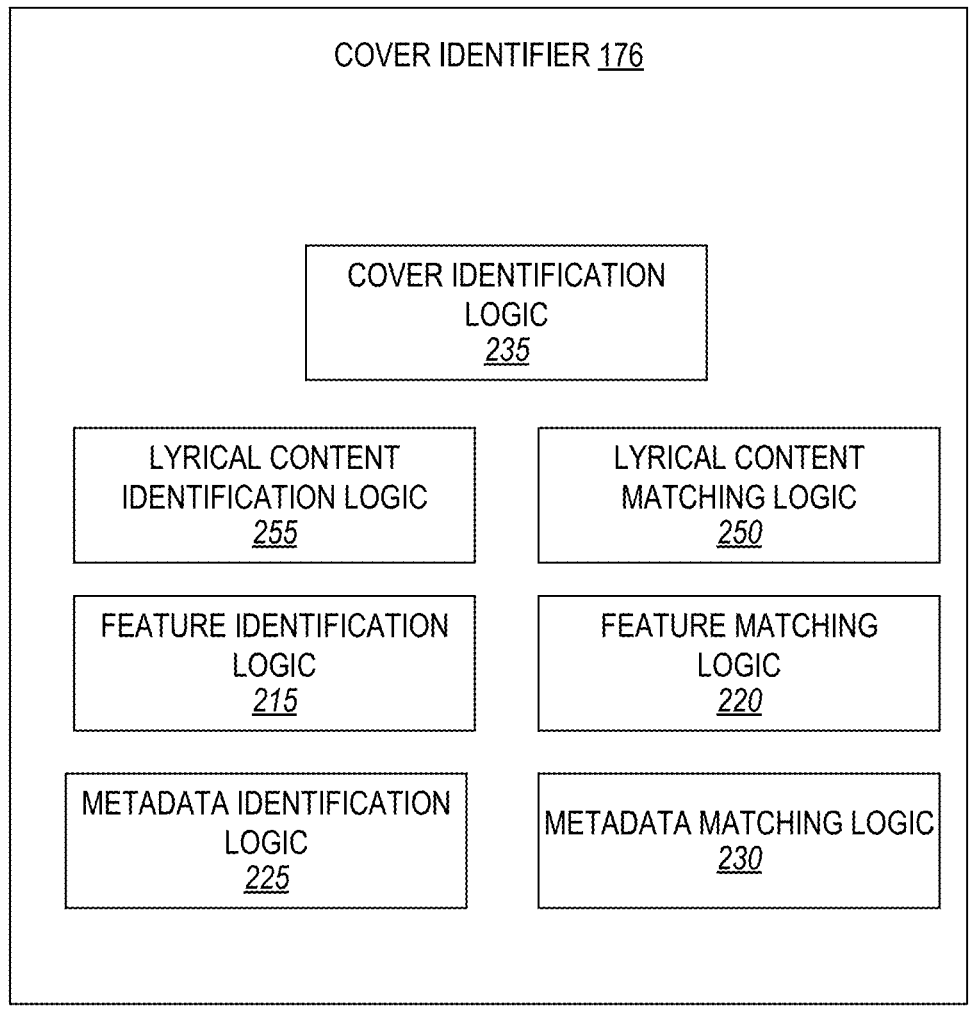
FIG. 2 is a block diagram illustrating a cover identifier, according to an embodiment.

Further details of the cover identifier 176 are described in FIG. 2, which includes an example embodiment of components and logic within the cover identifier 176.

In some embodiments, identification clients 190A-B may include a media classifier 152, a media identifier 160, a cover identifier 176 and/or one or more other components of the identification service 170. These components may perform the same operations as described with reference to the like-named components of the identification service, but may perform such operations locally at the computing device 101A-B of the media content sharing platform 101A-B. In such embodiments, these operations may be performed at a site of the media content sharing platform 175A-B so as to minimize network bandwidth utilization. Media content sharing platform 175A-B may provide an unidentified media content item (or segment of the unidentified media content item, or extracted features of the unidentified media content item) to the identification client 190A-B for feature identification and/or media content item identification prior to identification client 190A-B sending the unidentified media content item (or segment of the unidentified media content item, extracted features of the unidentified media content item or digital fingerprints of the unidentified media content item) across the network 131 to server computing device 150. Identification client 190A-B may identify the unidentified media content item as described above.

In some embodiments, media classification is performed by media classifier 152 running on identification client 152, and further processing is only performed if the unidentified media content item contains music. Such further processing may include operations performed by the identification client 190A-B (e.g., generating digital fingerprints, determining lyrical content, etc.) and/or operations performed by identification service 170.

In some embodiments, client computing device 101B includes or has access to a smaller library or repository of known media content items 142 (e.g., which may be stored in storage 140). The smaller repository of known media content items 142 may be smaller than the repository of known media content items 147A-B maintained on storage 145A-B for use by identification service 170. For example, known media content items 142 may be currently popular music. The known media content items 142 may include first and/or second digital fingerprints (e.g., for direct match determination and/or cover determination) of the known media content items 142. Additionally, storage 140 may include lyrical content 144 of the known media content items 142. Identification client may invoke media identifier 160 to determine whether an unidentified media content item is a copy of a popular known media content item of known media content items 142 and/or may invoke cover identifier 176 to determine whether the unidentified media content item is a cover of a popular known media content item of known media content items 142. If the media identifier 160 fails to identify the unidentified media content item as containing a copy of a known media content item and/or the cover identifier fails to identify the unidentified media content item as a cover of a known media content item, then identification client 190B may send a transaction request to identification service 170.

In some embodiments, identification client 190A-B and identification service 170 perform identification in stages. In a first stage, identification client determines a classification of the unidentified media content item using media classifier 152. If the unidentified media content item is classified as containing music, then in a second stage identification client 190A-B generates first digital fingerprints and sends them to identification service 170 for identification. If identification service 170 fails to identify the unidentified media content item from the first digital fingerprints, then it reports a negative result to identification client 190A-B. Subsequently, in a third stage identification client 190A-B may extract lyrical content and either determine lyrical similarities to lyrics of known media content items locally or send the lyrical content to identification service for identification service to determine such lyrical similarity. If any lyrical similarity is found to satisfy a criterion, then identification service may send a request to the identification client for the second digital signatures and/or metadata associated with the unidentified media content item. In a fourth stage, the identification service may then use the lyrical similarity, a metadata similarity and/or an audio/music similarity to a known media content item to determine that the unidentified media content item is a cover of the known media content item. In this staged approach, the number of communications over the network may be increased 131, but the amount of data that is sent in any given communication may be significantly reduced, and in many cases transmission of unidentified media content items and/or first and/or second digital fingerprints of the unidentified media content items may be eliminated, thus reducing overall bandwidth consumption.

Once a media item is identified as a cover of a known media item, that media item may be linked to the known media item in one or more of storages 145A-E. All covers of a known media item may be linked to that media item in the storage(s) 145A-E. Covers may also link to other covers of the same known media item.

In some instances, after determining that the unidentified media content item is a cover of a known media content item, identification service 170 may invoke the licensing logic 162. The licensing logic 162 may be invoked to determine a licensing rate to apply to a cover-media content item or a group of cover-media content items. Cover songs may vary aspects of the original work and thereby may include input based on both the original work and the performer's input in modifying the original work. Additionally, there are often different owners of composition rights (e.g., the publisher) and performance rights (e.g., the music label). For example, if someone makes a cover of a Beatles song, the copyright to that cover is not owned by the record label that owns the performance rights to the Beatles song, but the composition rights for that cover are still owned by the owner of the composition rights to the Beatles song. Additionally, composition rights may be split between lyrical rights and instrumental (musical composition other than the lyrics) rights, which may be owned by different copyright holders. As a result, licensing rates between cover songs of an original work and exact copies of an original work may be calculated differently. Additionally, some ownership rights to the original work do not apply to covers (e.g., such as performance rights), while other ownership rights (e.g., publisher rights) to the known media content item do apply to the cover-media content item.

There are different types of covers that may be identified as well, each of which has different impact on rights holders. For example, a cover may reuse lyrics of an earlier performance, but may use a different harmony and/or melody with those lyrics. In such an instance, only the holder of the lyrical rights to the original work of which the cover-media content item is a cover may be owed revenues. In another example, a cover may be an instrumental version of an earlier recording, or may use the harmony and melody of the earlier recording with different lyrics (e.g., as with a foreign language version of a song or a parody version of a song). In such an instance, only the holder of the musical composition rights (e.g., the rights holder for the harmony and melody) may be owed revenues. In another example, an original composition may have lyrical content, but the cover may be instrumental, the cover may be in a different language, the cover may be a parody where the words have changed but the music stays the same, there may be explicit and non-explicit versions of lyrics, and so on. In the assignment of royalties, it can be important to distinguish between these cases, and this is made possible by having knowledge of the lyrics that occur in a particular cover performance as well as the harmony and melody that occur in the particular cover performance. There is also a trend in the music market to individually license components (known as stems) of a recording. Royalties may be explicitly defined for each portion of a composition, and splits may be different for vocal stems versus purely instrumental strings, for example.

Licensing logic 162 may determine a licensing rate that a media content sharing platform 178A-B is to pay for user generated content that is a cover of a particular known media content item. In one embodiment, licensing logic 162 determines a licensing rate to apply to a cover media content item based on licensing and royalty rates that may be applied to the cover media content item, which may be dependent on whether the same lyrics are used, on whether the same music is used, and so on.

Licensing logic 162 may be invoked to determine a publishing rights holder of the known media content item of which the cover-media content item is a cover. Publishing rights holder information may be stored along with the known media content items 147A-147B within storage 145A-145B or may be stored in another storage location. The licensing logic 162 may query the storage 145A-145B for the publishing rights holder information. Alternatively, the licensing logic 162 may query other storages or other sources, including external sources to determine the publishing holder rights information.

Upon determining the publishing rights holder information of the known media content item, a publishing resource allocation may be calculated for the identified cover-media content item. In an embodiment, the licensing logic 162 may calculate resource allocation based upon publishing rights holder information which may include licensing and/or royalty fees for published cover-media content items. In an embodiment, if the identified cover-media content item is a cover of two or more known media content items, then licensing logic 162 may calculate a percentage based allocation between the two or more known media content items. The percentage based allocation may be based upon the percentage of the identified cover-media content item that matches each of the two or more known media content items. In an embodiment, licensing and/or royalty fees may differ depending on whether the cover-media content item has been uploaded by an amateur artist or officially released by a label and/or publisher.

Identified cover-media content items may be stored as cover-media content items 149 within storage 145E to create a repository of covers of known works. A cover repository may be beneficial to media content item owners, publishers, labels, and even consumers of the cover-media content items. For instance, the cover repository may be a searchable resource for content owners, publishers, and labels to search for covers of original media items for the purpose of determining publishing rights, compliance and licensing requirements, and for calculating royalty and licensing rates. Additionally, music labels and/or publishers may query the cover repository to discover new and rising performers. For example, a music label may wish to query the cover repository to find the most popular cover artists based upon different metrics. Then music labels may want to reach out to a popular cover artist for the purpose of signing the artist to their music label.

Publishers and music labels may also benefit from the cover repository to query musical trends based upon fans who consume the cover songs. For example, music labels may, in conjunction within the media content sharing platform, query the cover repository to determine which types of fans are interested in which performers. These metrics may then be used to target music content and different performers for consumers.

Media content items are classified in embodiments using machine learning profiles and/or machine learning models (i.e., profiles and models produced using machine learning techniques). Server computing device 150 may receive a collection of labeled media content items, which may be used to train a machine learning profile and/or model using supervised training. The media content items may be provided as an input to a machine learning profiler (not shown) as part of a training data set to generate the profiles and/or models. The machine learning profiler may perform supervised machine learning to identify a set of features that are indicative of a first classification and another set of features that are indicative of another classification. The first set of features indicative of the first classification (e.g., indicative of music) may be defined in a first model and a second set of features indicative of the second classification (e.g., lack of music) may be defined in a second model. Alternatively, profiles may be generated for more than two classifications.

Machine learning profiler may generate machine learning profiles for identifying one or more classes of media content items. For example, the machine learning profiler may generate a profile for identifying, for media content items having audio, whether the audio comprises music or does not comprise music. Similarly, the machine learning profiler may generate a profile for identifying, for audio, a classification wherein the audio comprises a particular categorization of music (e.g., a genre including rock, classical, pop, etc.; characteristics including instrumental, a cappella, etc., and so on). A machine learning profile generated by machine learning profiler may be provided to media classifier 152.

FIG. 2 is a block diagram of an example cover identifier 176 in accordance with some implementations of the disclosure. In general, the cover identifier 176 may correspond to the cover identifier 176 of server computing device 150 as shown in FIG. 1. In an embodiment, the cover identifier 176 includes a feature identification logic 215, a feature matching logic 220, a metadata identification logic 225, a metadata matching logic 230, a lyrical content identification logic 255, a lyrical content matching logic 250, and a cover identification logic 235. Alternatively, one or more of the logics and/or modules of the cover identifier 176 may be distinct modules or logics that are not components of cover identifier 176. Additionally, or alternatively, one or more of the modules or logics may be divided into further modules or logics and/or combined into fewer modules and/or logics.

In an embodiment, lyrical content identification logic 255 may be invoked to determine the lyrical content of an unidentified media content item. In one embodiment, lyrical content identification logic 255 includes one or more machine learning models trained to perform automatic speech recognition. Automatic speech recognition (ASR) is a field of computer science, artificial intelligence, and linguistics concerned with transforming audio data associated with speech into text data representative of that speech. The lyrical content identification logic applies the unidentified media content item to an ASR system that transcribes the unidentified media content item into text data representing sung or spoken lyrics contained in the unidentified media content item. In one embodiment, the ASR system is a remote component that the lyrical content identification logic 255 calls, and to which the lyrical content identification logic 255 provides the unidentified media content item (or at least an audio portion of the unidentified media content item). For example, the ASR system may be a commodity system such as Google® Cloud speech-to-text, Amazon® Transcribe, Mozilla® DeepSpeech, otter.ai®, and so on. Such commodity ASR systems are trained to identify spoken words. Alternatively, the ASR system may be machine learning model trained specifically to identify song/speech in music. The ASR system may then transcribe any speech/song from the unidentified media content item and return a textual transcription of the speech/song to lyrical content identification logic 255.

In one embodiment, the ASR system includes a pre-processing logic and a speech recognition engine. The pre-processing logic transforms the unidentified media content item into data for processing by the speech recognition engine. The speech recognition engine compares the speech recognition data with acoustic models, language models, and other data models and information for recognizing the lyrical content in the unidentified media content item. The pre-processing logic may reduce noise in the unidentified media content item and divide the unidentified media content item into frames representing time intervals for which the preprocessing logic determines features representing qualities of the audio data in the unidentified media content item, along with a set of those values (i.e., a feature vector) representing features within each frame. A number of approaches may be used by the preprocessing logic to process the unidentified media content item, such as mel-frequency cepstral coefficients (MFCCs), perceptual linear predictive (PLP) techniques, neural networks, linear discriminant analysis, semi-tied covariance matrices, and so on.

The speech recognition engine may process data output from the preprocessing logic (e.g., feature vectors referred to as embeddings) using one or more trained machine learning models. The speech recognition engine attempts to match received feature vectors/embeddings to language phonemes and/or words. The speech recognition engine computes recognition scores for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving a likelihood that the ASR system will output text data representing speech that makes sense grammatically. The speech recognition engine may use a number of techniques to match feature vectors to phonemes, for example using HMMs to determine probabilities that feature vectors may match phonemes. Sounds received may be represented as paths between states of the HMM and multiple paths may represent multiple possible text matches for the same sound. Ultimately, the speech recognition engine outputs text in the form of a sequence of words, text in the form of a sequence of phonemes, or text in the form of a combination of words and phonemes.

In one embodiment, lyrical content identification logic 255 may include or access a separate ASR system trained to perform ASR for each of multiple languages. For example, a first ASR system may include a machine learning model trained to transcribe speech in English, a second ASR system may include a machine learning model trained to transcribe speech in French, a third ASR system may include a machine learning model trained to transcribe speech in German, a fourth ASR system may include a machine learning model trained to transcribe speech in Korean, and so on.

Typical ASR systems that perform speech-to-text operations require that the language be specified before transcription is performed. However, the language used in unidentified media content items is generally unknown. In some embodiments, lyrical content identification logic 250 determines a likely language included in the unidentified media content item based on one or more cues or clues. In one embodiment, lyrical content identification logic selects one or more most common languages handled by lyrical content identification logic 255, and calls ASR systems trained for these one or more languages. Each ASR system may generate a result that includes a confidence score indicating a confidence that the result is accurate. The transcription with the highest confidence score may be selected and used for further processing.

In a further embodiment, lyrical content identification logic 255 determines geographical information associated with the unidentified media content item. In some instances, the unidentified media content item includes metadata indicating a geographic location (e.g., a country) where the unidentified media content item was created (e.g., where a recording was produced). In some instances, the media content sharing platform 175A-B includes information on a language setting and/or geographic location of a user account that uploaded the unidentified media content item. Geographic locations may each be associated with one or more dominant languages. Lyrical content identification logic 255 may select an ASR system trained to identify speech in the dominant languages of the determined geographic locations and/or an ASR system trained to identify speech in the language of the user account's language setting.

In one embodiment, lyrical content identification logic 255 determines whether the unidentified media content item contains speech/song before attempting to determine the lyrics of that speech/song. The lyrical content identification logic 255 may use various techniques to determine whether the unidentified media content item includes speech/song. In one embodiment, lyrical content identification logic 255 applies one or more voice activity detection (VAD) techniques. Such techniques may determine whether speech is present in audio data based on various quantitative aspects of the audio data, such as a spectral slope between one or more frames of the audio data; energy levels of the audio data in one or more spectral bands; signal-to-noise ratios of the audio data in one or more spectral bands; or other quantitative aspects. Alternatively, or additionally, lyrical content identification logic may implement a trained machine learning model that has been trained as a limited classifier configured to distinguish speech/song from background audio and/or instrumental music. The classifier may be implemented by techniques such as linear classifiers, support vector machines, neural networks and decision trees. Additionally, or alternatively, Hidden Markov Model (HMM) or Gaussian Mixture Model (GMM) techniques may be applied to compare the audio data of the unidentified media content item to one or more acoustic models. The acoustic models may include models corresponding to song, noise (such as environmental noise or background noise), instrumental music that lacks voice, or silence. Different acoustic models may be used for different genres of music in embodiments. Still other techniques may be used to determine whether an unidentified media content item contains sung lyrics. If an unidentified media content item fails to include any speech/song, then further operations for identification of lyrics may not be performed, and operations may be performed to determine whether the unidentified media content item is an instrumental cover of a known media content item (e.g., using digital fingerprints/features and/or metadata).

Lyrical content matching logic 250 compares the lyrical content associated with the unidentified media content item (i.e., the lyrical content extracted from the unidentified media content item) to lyrical content of known media content items to identify similarities or matches (referred to as a lyrical similarity) between the lyrical content of the unidentified media content item and the lyrical content of a known media content item. Often the transcription of the unidentified media content item is not an accurate transcription. However, an accurate transcription is not necessary to identify an unidentified media content item as a cover-media content item that is a cover of a known media content item, because it merely needs to provide enough textual data to be confident of a lyrical match.

Lyrical content matching logic 250 may apply any of a variety of approximate text-matching methods to detect sufficient matching between the lyrical content of the unidentified media content item and lyrical content of a known media content item. Examples of such approximate text-matching techniques that may be applied by lyrical content matching logic include n-grams, bag-of-word models, statistically improbable phrases, Levenshtein distance of phrases, lengths of longest matching phrases, and word frequency. One of more of these techniques may be used together or alone. Additionally, or alternatively, the lyrical content matching logic may compare lyrics by phonetic distance, such as by comparing phonetic strings rather than or in addition to text comprising words, and allowing for approximate matches between similar phonemes. Both textual words and phonemes, being strings of discrete symbols, may be hashed and indexed, allowing fast and efficient searches over large lyrics reference databases (e.g., lyrical content 143). A result of the comparison and matching is one or more similarity scores each representing a lyrical similarity between the unidentified media content item and a known media content item. One or a set of lyrical similarity scores may be generated for each known media content item to which the unidentified media content item is compared.

In one embodiment, lyrical content is associated with timing information. Lyrical content identification logic 255 may correlate, for each phoneme, word, set of phonemes and/or set of words determined from the unidentified media content item, a time offset or time range associated with that phoneme, word, set of phonemes or set of words. This enables the timing of words/phonemes from the unidentified media content item to be compared to the timing of words/phonemes of known media items, and provides additional information for matching. Such timing information may be combined with beat identification, and may be normalized to beats in the unidentified media content item and known media content items as well to improve a usefulness of the timing information. Beat identification and normalization to beat is discussed in greater detail below.

In one implementation, a comparison between time-referenced words and/or phonemes of the unknown media content item and time-referenced words and/or phonemes of a known media content item may be performed by computing self-similarity matrices for one or more groupings of words/phonemes for the unidentified media content item and the known content media item. Additionally, or alternatively, cross-similarity matrices may be computed for each time-referenced word and/or phoneme grouping between the unidentified media content item and the known content media item. Cross-similarity matrices may be used to measure the similarities between the two different media content items. In an embodiment, cross-similarity matrices may be generated by calculating Euclidean distances between possible groupings of words from each media content item.

Referring back to FIG. 1, as shown cover identifier 176 may be present on identification clients 190A-B and/or on identification service 170. The cover identifier 176 on identification client 190B may access a database of lyrical content of known media items 144 and perform comparisons at computing device 101B. Alternatively, cover identifier 176 on identification client 190A-B may determine the lyrical content of the unidentified media content item and send the lyrical content to identification service for further processing by cover identifier 176 on the identification service. Alternatively, identification client 190A-B may send the unidentified media content item to identification service 170, and cover identifier 176 on identification service 170 may determine the lyrical content and then determine lyrical similarities to known media content items.

Returning to FIG. 2, in an embodiment, feature identification logic 220 may be invoked to determine whether one or more second digital fingerprints (i.e., one or more features or feature vectors extracted from the unidentified media content item) are similar to second digital fingerprints of known media content items. As previously indicated, the unidentified media content item may have been divided into overlapping or non-overlapping segments or frames, and second digital fingerprints may have been computed for each such segment or frame. Features included in the second digital fingerprints may be beat-synchronized features in embodiments. Beat-synchronized features may be captured features such as pitch, timbre, and rhythm that have been normalized to be tempo-invariant. The benefit to identifying beat-synchronized features/beat-synchronized digital fingerprints is that comparisons may be made between cover works and original works even when the tempo, instrumentation, and vocals type vary significantly between the two media items. Beat identification may be used to identify one or more segments within an unidentified media content item. Normalization may include down-scaling features to an individual beat.

A segment or frame of the unidentified media content item may be analyzed with respect to a set of features including loudness, pitch, beat, timbre, rhythm, brightness, spectral bandwidth, energy in one or more spectral bands, spectral steadiness, Mel-frequency cepstral coefficients (MFCCs), and so on. Feature identification logic 220 may determine values for some or all of these features, and may generate a feature vector for the segment that includes the determined feature values. The feature vector may be a digital fingerprint (e.g., second digital fingerprint) of one or more segments of the media content item.

In some implementations, feature vectors (e.g., digital fingerprints) of one or more segments of the media content item are generated remotely (e.g., by a remote computing device executing a media content sharing platform), and such feature vector(s)/digital fingerprint(s) are received from the remote computing device rather than the segments of the media content item. The feature vector(s)/digital fingerprint(s) may be received along with metadata associated with the unknown media content item rather than receiving the media content item. This may reduce network bandwidth utilization.

The set of features (e.g., the feature vector(s) or digital fingerprint(s)) may be provided to the feature matching logic 220 to determine whether the set of features/second digital fingerprint of the unidentified media content item is similar to a defined set of features/second digital fingerprint for a known content item. For example, the set of features of the unidentified media content item may be compared to sets of defined features (digital fingerprints) of multiple known content media items.

In one implementation, a comparison between a second digital fingerprint/feature vector of the unknown media content item and a second digital fingerprint/feature vector of a known media content item may be performed by computing self-similarity matrices for each of the feature types for the unidentified media content item and the known content media item. Self-similarity matrices may be used to determine similarities of features within a media content item. In an embodiment, self-similarity matrices may be generated by calculating Euclidean distances between feature vectors within the media content item. Additionally, cross-similarity matrices may be computed for each feature type between the unidentified media content item and the known content media item. Cross-similarity matrices may be used to measure the similarities between the two different media content items. In an embodiment, cross-similarity matrices may be generated by calculating Euclidean distances between possible pairs of feature vectors from each media content item. In other embodiments, cross-similarity matrices may be calculated differently depending on the feature vectors. Generation of cross-similarity matrices and self-similarity matrices are further described herein.

The cross-similarity matrices and the set of self-similarity matrices may then be fused using Similarity Network Fusion (SNF) techniques. SNF is a computational method for data integration by constructing a sample similarity network for each of the data types and then iteratively integrating the networks using network fusion. The resulting matrices may then be transformed into a binary cross-recurrence plot, which is a plot showing, at a given moment of time, the instances an occurrence of where a feature occurs. In one implementation, the binary cross-recurrence plot may then be scored using a Smith-Waterman algorithm to determine a similarity score between the unidentified media content item and the known media content item. In other implementations, the feature matching logic 220 may implement other matching algorithms to determine the similarity between the features/digital fingerprints of the unidentified media content item and the features/digital fingerprints of the known media content item.

In one embodiment, for each comparison of the feature vector(s)/digital fingerprint(s) of an unknown media content item to the feature vector(s)/digital fingerprint(s) of a known media content item, a feature similarity score (also referred to as a music/audio similarity score) is computed. The feature similarity score may indicate a level of similarity between the audio features of the unknown media content item and the audio features of the known media content item, referred to herein as music similarity and/or audio similarity. An audio similarity score/music similarity score may be generated for each comparison of the second digital fingerprint(s) of the unidentified media content item to the second digital fingerprint(s) of a known media content item.

In an embodiment, the metadata identification logic 225 may identify descriptive text stored in metadata of the unidentified media content item. Such descriptive text may be determined from a received media content item. Alternatively, or additionally, the descriptive text may be determined from received metadata that is associated with the media content item. Alternatively, the descriptive text (metadata) may have been extracted from the unidentified media content item at a remote location and provided to cover identifier 176.

The descriptive text may be normalized and processed using one or more word matching algorithms and/or trigram matching algorithms. Text normalization is a process of transforming text into a canonical form. For instance, different ways of writing the term "two hundred dollars" may include "$200", "200 bucks", and "2 Benjamins." Text normalization may process the inputting text, such as the examples described, and transform each of them into the canonical form of "two hundred dollars." Normalized descriptive information associated with an unknown media content item may be compared to normalized descriptive information associated with known media content items to determine whether the unidentified media content item is a cover of a known media content item and/or to narrow identification of a known media content item as a cover to a subset of the known media content items 145A-145B. For example, the unidentified media content item may be associated with metadata comprising the description of "Rolling Stones." This metadata may be used to determine a subset of known media content items that match the artist Rolling Stones. Processing resources may be conserved when identifying an unidentified media content item if the pool of known media content items to compare against is narrowed to a subset of known media content items.

In an embodiment, the metadata matching logic 230 may be invoked by the metadata identification logic 225 following the identification of descriptive text from metadata of the unidentified media content item. The metadata matching logic 230 may compare the metadata associated with the unidentified media content item to additional metadata associated with a known media content item. Using the previous example of metadata containing "Rolling Stones," the metadata matching logic 230 may compare the unidentified media content item metadata to the index of known media content items 143 in order to determine a subset of similar known media content items that have associated metadata that is similar to the metadata of the unidentified media content item, "Rolling Stones."

In one embodiment, for each comparison of the metadata of an unknown media content item to the metadata of a known media content item, a metadata similarity score is computed. The metadata similarity score may indicate a level of similarity between the metadata of the unknown media content item and the metadata of the known media content item.

In an embodiment, the cover identification logic 235 may be invoked to determine whether the unidentified media content item is a cover of a known media content item. The cover identification logic 235 may use one or more of the similarity determinations (e.g., the audio or music similarity score, the lyrical similarity score and/or the metadata similarity score) generated from the feature matching logic 220, the lyrical content matching logic 250 and the metadata matching logic 230.

There are several possible techniques that may be used to identify an unidentified media content item as a cover of a known media content item. In a first technique, the one or more highest-scoring lyrical similarity scores are compared to a threshold. If a similarity score meets or exceeds the threshold, then a determination is made that the unidentified media content item is a cover of a known media content item for which the similarity score met or exceeded the similarity threshold.

In another embodiment, a combined similarity score for a comparison between the unidentified media content item and a known media content item may be generated by combining the lyrical similarity score with the audio or music similarity score and/or the metadata similarity score. The combined similarity score may be an unweighted combination, in which each similarity score is given an equal weighting, or may be a weighted combination, in which the different similarity scores are given different weightings. For example, the lyrical similarity score may be weighted more heavily than the audio/music similarity score in an embodiment.

In another embodiment, a cross-similarity matrix is generated between the unidentified media content item and a known media content item using the time-referenced lyrics (words and/or phonemes). This cross-similarity matrix may then be combined with other cross-similarity matrices (e.g., for the features described above) using Similarity Network Fusion (SNF), as described above. As previously described, SNF is a computational method for data integration by constructing a sample similarity network for each of the data types and then iteratively integrating the networks using network fusion. The resulting matrices may then be transformed into a binary cross-recurrence plot. In one implementation, the binary cross-recurrence plot may then be scored using a Smith-Waterman algorithm to determine a similarity score between the unidentified media content item and the known media content item. The similarity score may be compared to a threshold, and the unidentified media content item may be identified as a cover of the known media content item if the similarity score meets or exceeds the threshold.

Referring to FIG. 1, upon cover identifier 176 determining that the unidentified media content item is a cover of a known media content item, the media labeler 178 may be invoked. In an embodiment, the media labeler 178 may store the unidentified media content item as a cover media content item 149 within the storage 145E. The media labeler 178 may update the metadata within the cover media content item 149 to indicate that the cover media content item 149 is a cover of a known media content item. The media labeler 178 may also link the cover media content item to the known media content item in the storage (e.g., in a music identification database).

Upon determining that the unidentified media content item is a cover of a known media content item, the licensing logic 162 may be invoked to determine a licensing rate to apply to a cover media content item or a group of cover media content items.

FIGS. 3A-5 are flow diagrams illustrating various methods of identifying an unidentified media content item as a cover-media content item and performing actions based on a result of such identification. The methods may be performed by processing logic that comprises hardware (e.g., circuitry, dedicated logic, programmable logic, microcode, etc.), software (e.g., instructions run on a processor), firmware, or a combination thereof. The methods may be performed, for example by one or more of computing devices 101A-B and/or server computing device 150 of FIG. 1 in embodiments.

Figure 3A:
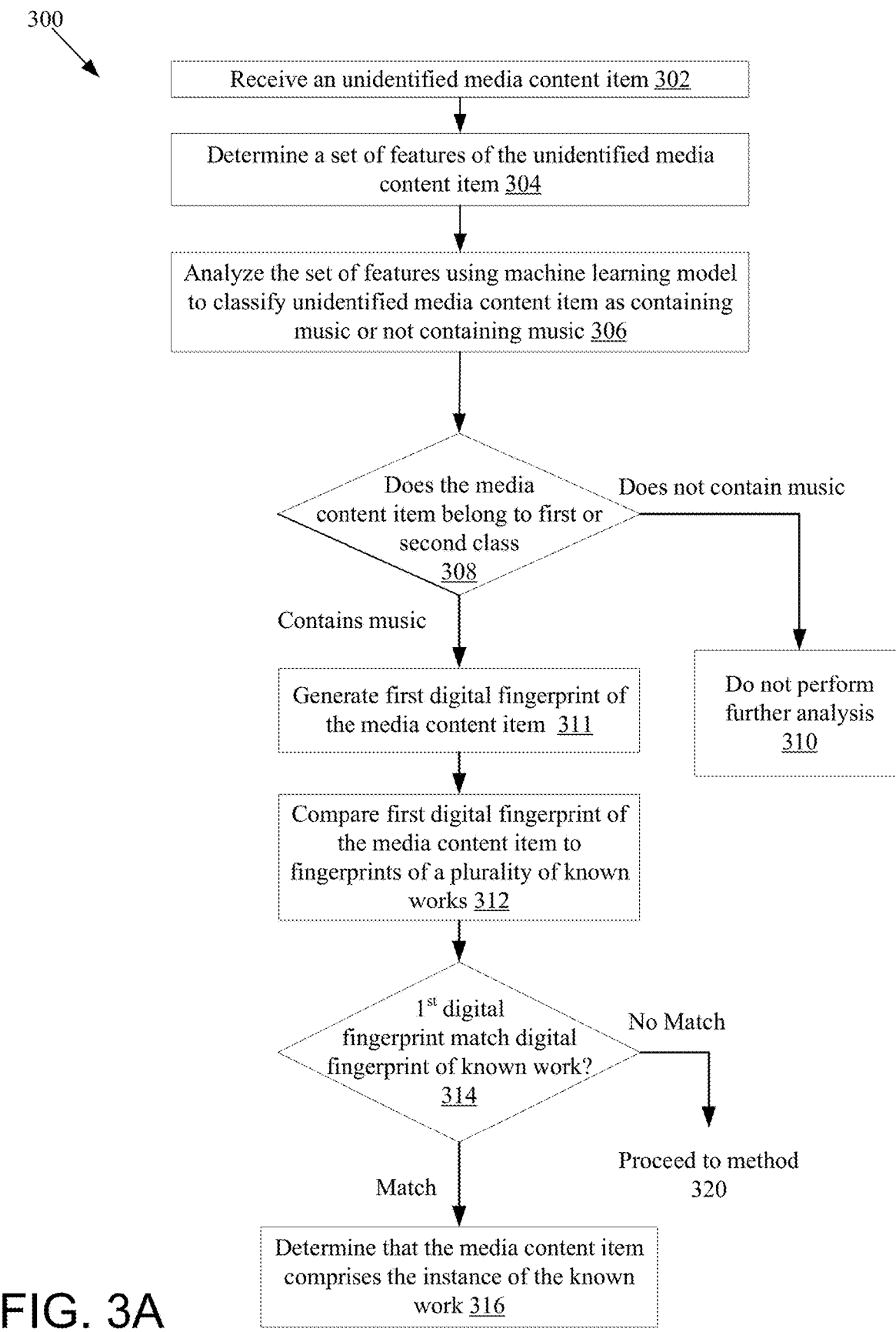
FIG. 3A is a flow diagram illustrating a method for determining whether an unidentified media content item is a copy of (or contains a copy of at least a portion of) a known media content item, according to an embodiment.

FIG. 3A is a flow diagram illustrating one embodiment of a method for determining whether an unidentified media content item is music, a copy of a known media content item, and/or a possible cover version of a known media content item. At block 302 of method 300, processing logic receives an unidentified media content item. The unidentified media content item may be received from additional processing logic hosted by a same computing device as the processing logic executing the method. Alternatively, the media content item may be received from a remote computing device. In one embodiment, the media content item is a live stream, and the live stream is periodically analyzed. For example, a segment of the live stream may be analyzed every few minutes.

A set of features of the media content item is determined at block 304. In one embodiment, prior to determining the set of features, processing logic determines that the unidentified media content item contains audio. In one embodiment, the set of features that are extracted are the set of features which optimally determine the likelihood that a media content item belongs to a classification. For example, the features that are extracted from the media content item may include the loudness envelope of the audio component of the media content item to determine the loudness at each moment in time. Features representative of the brightness of the audio (e.g., bass and treble component of the audio) may also be extracted. A derivative of the loudness envelope may be taken to identify the change in the loudness at each time. An FFT algorithm identifying other characteristics and an MFCC algorithm may be applied to identify the frequency domain characteristics and the clustered features of the media content item. Features may be extracted at an interval (e.g., 1 second interval, 0.5 second interval, 0.10 second interval). In another example, fifty two features may be extracted at multiple time intervals and used to generate a feature vector. Alternatively, more or fewer features may be extracted and used to generate a feature vector.

At block 306, the set of features is analyzed using machine learning profiles for a first and second class of media content items. In one embodiment, a single machine learning profile (also referred to herein as a media classification profile) contains models for multiple different classifications of media content items. Alternatively, a separate machine learning profile may be used for each model. In one embodiment, the machine learning profiles comprise a machine learning model and other associated metadata. The extracted features of the media content item are supplied to the machine learning model(s) (e.g., as a feature vector) and an output may be generated indicating the likelihood that the media content item matches the classification of the machine learning profile. For example, a media classification profile may identify a first percentage chance that a media content item comprises audio features representative of music and a second percentage change that the media content item comprises audio features representative of a lack of music.

If at block 308 it is determined that the media content item belongs to the first class of media content items (e.g., those containing music), the method continues to block 311. If it is determined that the media content item belongs to the second class of media content items (e.g., those not containing music), the method continues to block 310. In one embodiment, the percentage chance (or probability or likelihood) that the media content item belongs to a particular classification is compared to a threshold. If the percentage chance that the media content item belongs to a particular class exceeds the threshold (e.g., which may be referred to as a probability threshold), then the media content item may be classified as belonging to the particular class.

In some embodiments, thresholds on particular features may be used instead of or in addition to the probability threshold. For example, specific thresholds may exist for only a first feature, such as the loudness feature, or the threshold may exist for multiple features, such as both the loudness and brightness features. Thresholds and any accompanying combination of thresholds may be stored in the metadata of the associated machine learning profile. If the probability that a media content item belongs to a particular class exceeds or meets a probability threshold of the machine learning profile, then it may be determined that the media content item is a member of that particular class. If the probability fails to meet or exceed the probability threshold, then it may be determined that the media content item does not belong to the class and/or belongs to another class. In one embodiment, a machine learning profile may have a second machine learning model with its own thresholds to be applied to the media content item to determine if the media content item belongs to the second class.

At block 310, when the media content item is determined to belong to the second class of media content items, the media content item will not be sent for further analysis and no further processing may be performed to identify the media content item. For example, no additional analysis may be performed if an audio media content item is classified as not containing music. In an example, generally audio media content items are processed to determine whether the media content item matches one of multiple known audio works and/or is a cover of one of multiple known audio works, referred to as identification and cover identification, respectively. Such processing can utilize a significant amount of processor resources as well as network bandwidth resources. However, usually non-musical audio media content items are not registered for copyright protection. A significant amount of audio media content items on some media content sharing platforms may not contain music (e.g., up to 50% in some instances). Accordingly, resource utilization may be reduced by 50% in such an instance by identifying those media content items that do not contain music and then failing to perform additional processing on such media content items in an attempt to identify those media content items. A determination that the media content item belongs to a second class that will not be further analyzed reduces the bandwidth and/or processor utilization of an identification service and frees up additional processing resources for analyzing media content items that belong to the first class. In an example, the first class is for media content items which have music and are to be matched against all registered copyrighted music and the second class is for media content items which do not have music and will not match any registered copyrighted music. Determining that the media content item does not contain music removes a need to test the media content item against any registered copyrighted music, allowing the further processing to be bypassed and the method 300 to end without incurring additional bandwidth and processing resource usage.

At block 311, processing logic generates a first digital fingerprint of the media content item. The first digital fingerprint may include different segments, where each segment of the first digital fingerprint corresponds to a segment of the media content item. Alternatively, processing logic may generate multiple first digital fingerprints of the media content item, where each such first digital fingerprint is of a different segment of the media content item. In one embodiment, processing logic divides the unidentified media content item into a plurality of segments. Processing logic then generates, for one or more segments of the plurality of segments, a respective first digital fingerprint from the segment.

At block 312, processing logic compares the one or more first digital fingerprints of the media content item to first digital fingerprints of a plurality of known works. Comparison may include determining whether consecutive segments of the first digital fingerprint of the media content item and a known work match. Alternatively, processing logic may generate the first digital fingerprints and send them to a second processing device for comparison. In an embodiment, processing logic compares each respective first digital fingerprint in a sequence of first digital fingerprints to a plurality of stored first digital fingerprints of a known media content item.

At block 314, processing logic (or second processing logic) determines whether any of the digital fingerprints matches one or more digital fingerprints of a known work. If a match is found, the method continues to block 316, and the media content item is identified as being or containing an instance of the known media content item. If at block 314 no match is found (e.g., if, based on the comparing, at least a threshold amount of the digital fingerprints of the one or more segments fail to match stored digital fingerprints of any the plurality of known media content items), then the method may proceed to method 320, depicted in FIGS. 3B-3C, method 350, depicted in FIG. 3D, or method 370, depicted in FIG. 3E.

Figure 3B:
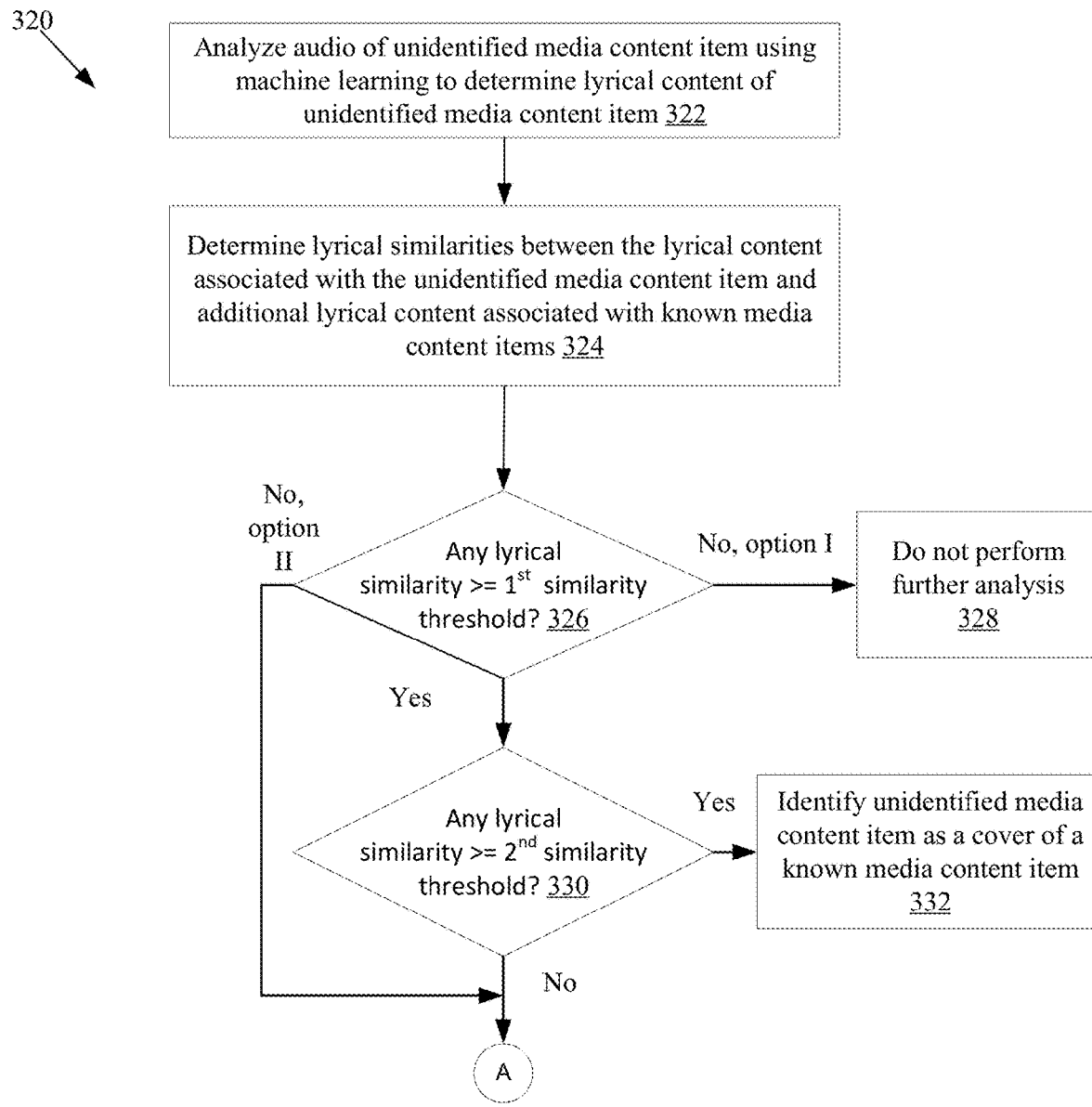
FIGS. 3B-C illustrate a flow diagram illustrating a method for determining an unidentified media content item as cover of a known media content item, in accordance with another embodiment.
Figure 3C:
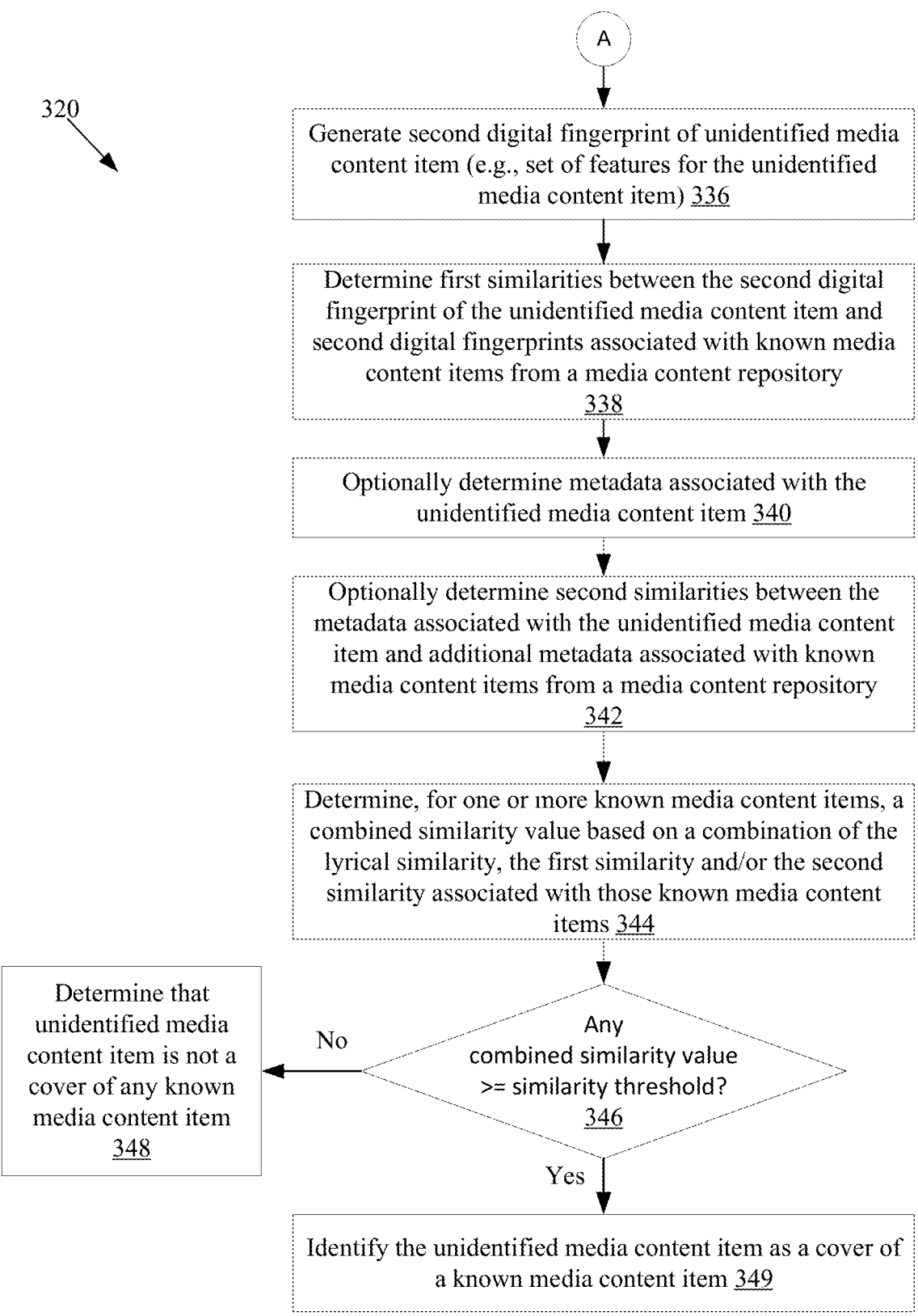

FIGS. 3B-3C provide a flow diagram illustrating method 320 for determining whether an unidentified media content item is a cover of a known media content item. In some embodiments, method 320 is performed after method 300. Alternatively, method 320 may be performed after receiving an unidentified media content item, and without first performing method 300.

At block 322, processing logic analyzes audio of the unidentified media content item using machine learning (e.g., ASR) to determine lyrical content of the unidentified media content item. The lyrical content may be or include words of a musical composition. The lyrical content that is output may be a textual representation and/or a phonetic representation of the lyrics/words transcribed from the audio. In one embodiment, a call is made to a third party audio transcription service to perform the operations of block 322. The audio transcription service may then provide a response that includes the lyrical content as text and/or phonemes.

At block 324, processing logic compares the lyrical content of the unidentified media content item to lyrical content of a plurality of known media content items. Based on the comparison, processing logic determines lyrical similarities (e.g., lyrical similarity scores or values) between the lyrical content associated with the unidentified media content item and additional lyrical content associated with the various known media content items.

In one embodiment, determining the lyrical similarity between the lyrical content of the unidentified media content item and the lyrical content of a known media content item is performed by comparing n-grams between the two sets of lyrical content and counting a number of matches of the n-grams. As used herein, an n-gram is a sequence of n words. For example, a 4-gram may be a sequence of 4-words that appear together in the lyrical content of the unidentified media content item. In one embodiment, multiple rounds of matching n-grams may be performed. For example, processing logic may start with a 4-gram and determine a number of matches. If there were more than a lower threshold number of matches but less than an upper threshold number of matches, then processing logic may attempt to match 5-grams. In another embodiment, if a threshold number of n-gram matches are found (e.g., over 1000 4-gram matches), processing logic may dynamically determine a longest string that matches and set an n-gram value based on that longest string. Processing logic may then determine a number of matches using that new n-gram value.

In one embodiment, generating the similarity score between the lyrical content associated with the unidentified media content item and the additional lyrical content associated with a known media content item includes determining a match count by counting at least one of a) a number of words and n-grams that match between the lyrical content of the unidentified media content item and the additional lyrical content of the known media content item orb) a number of phonemes and n-grams that match between the lyrical content of the unidentified media content item and the additional lyrical content of the known media content item. Additionally, generating the similarity score may include dividing the match count by a greater of a) a number of words or phonemes from the lyrical content of the unidentified media content item orb) a number of words or phonemes from the lyrical content of the known media content item.

In some embodiments, timing information is used to improve a lyrical match between lyrical content of the unidentified media content item and lyrical content of a known media content item. Timing information may be determined for each word in the lyrics (e.g., time offset for each word). This enables processing logic to not only match words and n-grams, but also to match the timing of words and n-grams (e.g., to determine if matches are made in similar locations and order between media content items). For example, at 1 minute into the unidentified media content item and the known media content item, two words might match, and at two minutes into these media content items two more words might match. This timing information increases a confidence that an unidentified media content item is a cover of a known media content item. With the use of timing information for the lyrical match, the lyrical match can be computed using a cross-similarity matrix (described elsewhere herein), and this lyrical cross-similarity matrix may be combined with other cross-similarity matrices determined for various audio/musical features using a similarity fusion network (also described elsewhere herein). In embodiments, a beat or tempo of the unidentified media content item (and of known media content items) may be determined, and the timing of the lyrics can be beat-normalized to the beat/tempo. This can improve the accuracy of identifying covers that have a different beat/tempo from the known media content item for which they are a cover.

In one embodiment, determining the lyrical similarity between the lyrical content associated with the unidentified media content item and the additional lyrical content associated with a known media content item includes identifying one or more words in the lyrical content associated with the unidentified media content item, determining that the one or more words occur at a first time offset within the lyrical content associated with the unidentified media content item, comparing the one or more words in the lyrical content associated with the unidentified media content item with one or more additional words that occur at the first time offset within the additional lyrical content associated with the known media content item, and generating a similarity score between the one or more words and the one or more additional words that occur at the first time offset.

Processing logic then determines whether the lyrical similarities satisfy one or more criteria. For example, processing logic may determine whether any determined lyrical similarity meets or exceeds a lyrical similarity threshold. In one embodiment, at block 326, processing logic determines whether any of the lyrical similarity scores meets or exceeds a first similarity threshold. The first similarity threshold may be a lower similarity threshold. In one embodiment, if no lyrical similarity score meets or exceeds the first threshold, the method processed to block 336. In another embodiment, if no lyrical similarity score meets or exceeds the first threshold, the method proceeds to block 328, at which no further analysis is performed. If at least one lyrical similarity score meets or exceeds the first threshold, the method proceeds to block 330.

At block 330, processing logic determines whether any lyrical similarity score meets or exceeds a second similarity threshold, which may be an upper lyrical similarity threshold. If so, the method proceeds to block 332 in an embodiment, and at block 332 processing logic identifies the unidentified media content item as a cover of the known media content item for which the similarity score met or exceeded the second similarity threshold. For example, if the lyrical content of the unidentified media content item closely matches the lyrical content of a known media content item, then it can be determined that the unidentified media content item is a cover of the known media content item without performing further analysis.

At block 336, processing logic generates a second digital fingerprint (or multiple second digital fingerprints) of the unidentified media content item. For example, the unidentified media content item may be divided into segments, and second digital fingerprints may be generated of each of the segments. The second digital fingerprint(s) may be similar to the first digital fingerprint(s), but may focus on different combinations of features/feature vectors. In one embodiment, the second digital fingerprint(s) are generated by processing logic of computing device 101A of FIG. 1. Alternatively, the second digital fingerprint(s) are generated by processing logic of server computing device 150 of FIG. 1. Generating the second digital fingerprint(s) may include generating a plurality of feature vectors for the unidentified media content item. For example, processing logic may determine a set of feature vectors based upon audio features including, but not limited to, pitch, timbre, and rhythm.

Figure 4A:
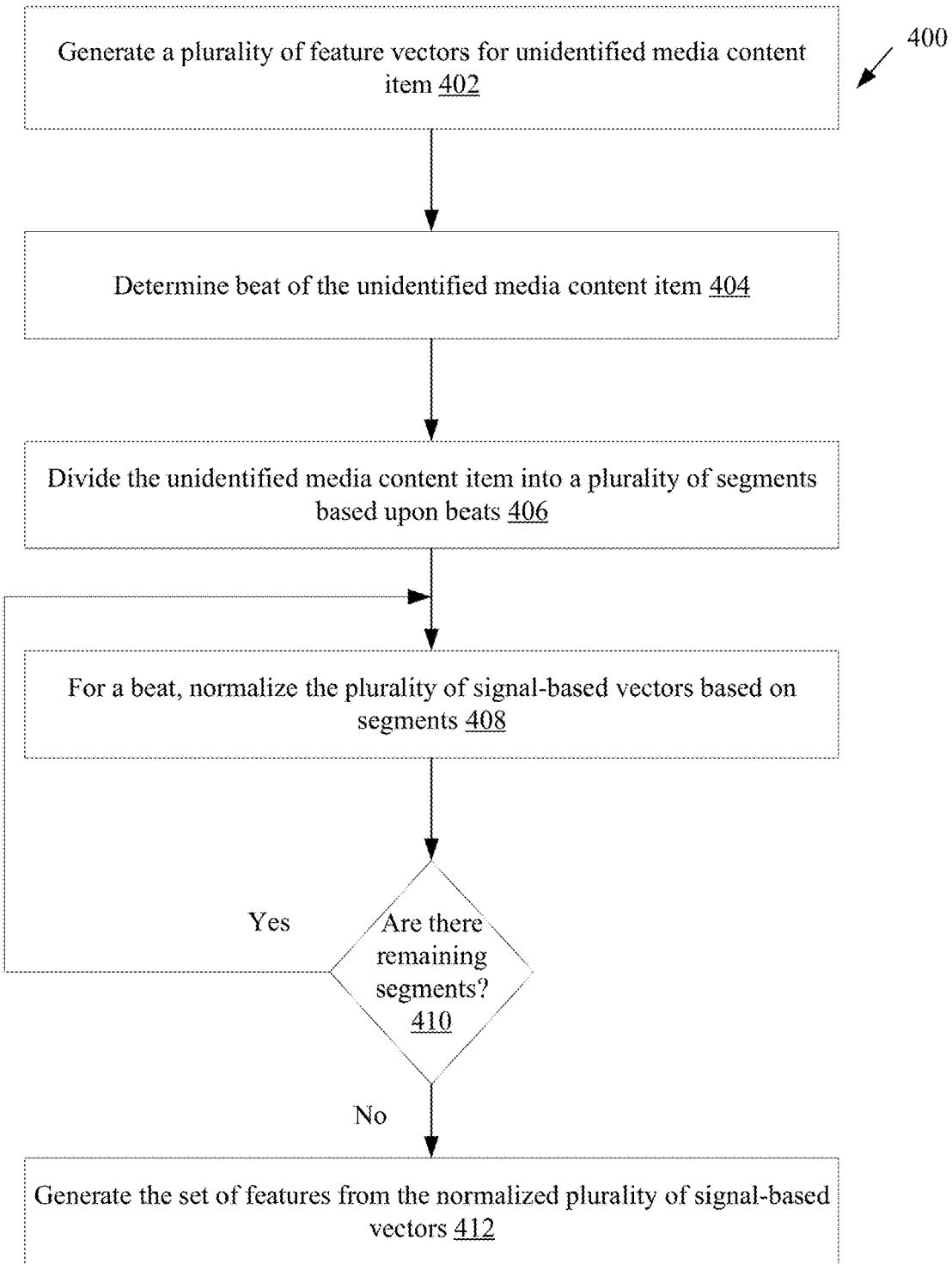
FIG. 4A is a flow diagram illustrating a method for generating a set of feature vectors for an unidentified media content item, according to an embodiment.

FIG. 4A is a flow diagram illustrating a method 400 for generating a set of feature vectors (e.g., a second digital fingerprint) for an unidentified media content item, according to an embodiment. Processing logic may generate one or more digital fingerprints that comprise the set of feature vectors and/or that are based on the set of feature vectors. In one embodiment, the digital fingerprint(s) are generated by processing logic of computing device 101A of FIG. 1. Alternatively, the digital fingerprint(s) are generated by processing of server computing device 150 of FIG. 1.

Figure 6:
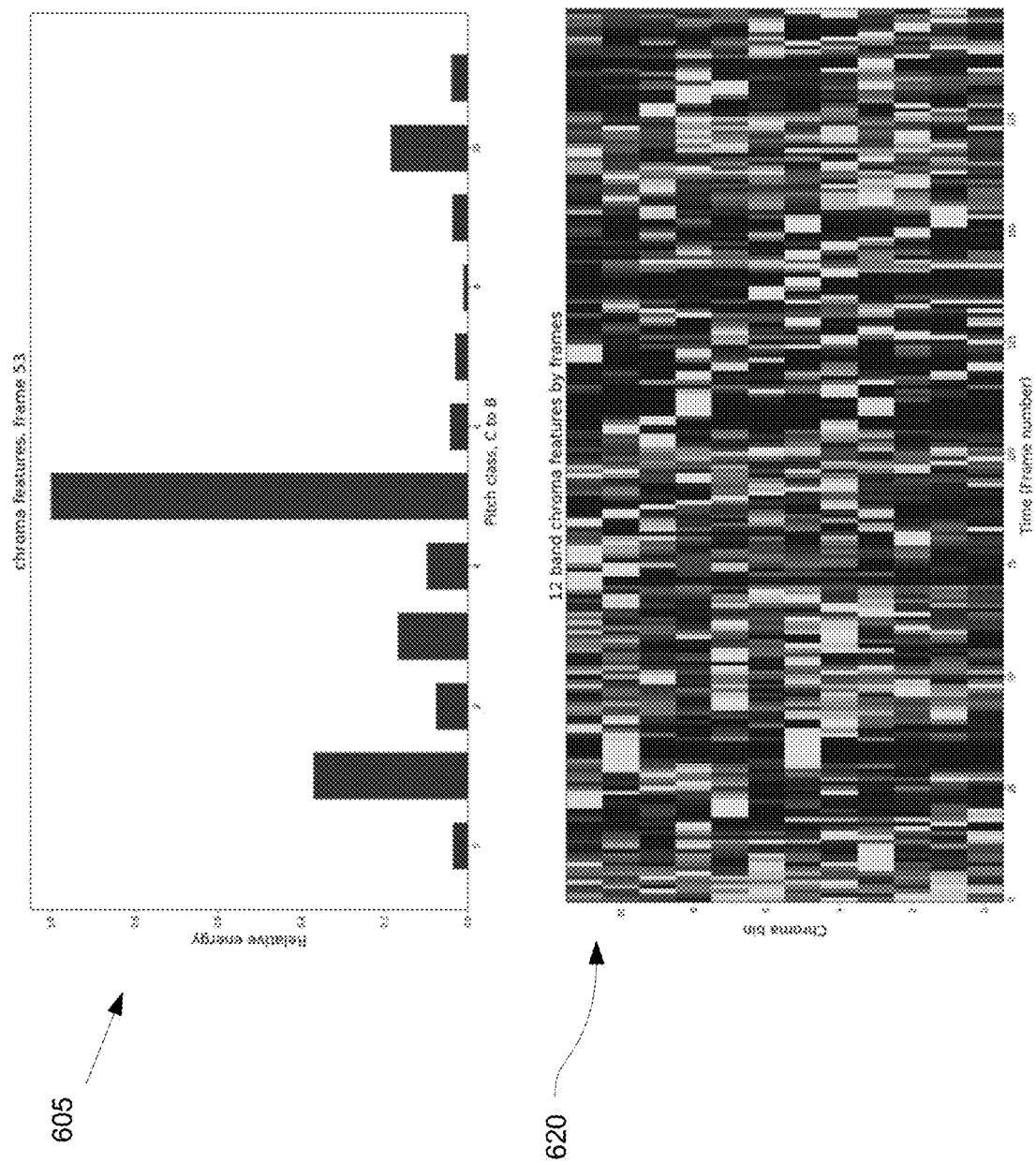
FIG. 6 depicts examples of pitch features extracted from an unidentified media content item, according to an embodiment.

At block 402, processing logic generates a plurality of feature vectors for the unidentified media content item. In an embodiment, the feature identification logic 215 determines a set of feature vectors based upon audio features including, but not limited to, pitch, timbre, and rhythm. In an embodiment, the feature identification logic 215 performs harmonic pitch class profile analysis. Harmonic pitch class profiles are a group of features extracted from an audio signal that are based on a pitch class profile. In an embodiment, the feature identification logic 215 performs harmonic pitch class profile analysis using short-time Fourier transform over a set of overlapping time windows. For example the short-time Fourier transform may be performed over a time windows of 25 milliseconds with a ¾ window overlap. Other embodiments may implement longer or shorter time windows with either larger or smaller overlaps between the time windows. This may generate a chroma feature vector for each window that contains the strength of each pitch class. FIG. 6 depicts examples of chroma features extracted from an unidentified media content item. Graph 605 of FIG. 6 illustrates a chroma feature vector of a single window. The vertical axis represents relative energy for each pitch class and the horizontal axis represents the various pitch classes divided by notes. In graph 605 the notes that have the highest relative energy are notes Db, F, and Bb, which together make a Bb minor harmony.

The processing logic generates a set of chroma feature vectors that represent the time windows that make up the entire unidentified media content item. Graph 620 of FIG. 6 illustrates a sequence of the set of chroma feature vectors for an unidentified media content item. The horizontal axis of the graph 620 represents the different feature vectors for each of the time windows, while the vertical axis represents the various pitch classes divided by notes. The higher relative energy is represented by a darker tone while lower relative energy is represented by lighter tones.

In an embodiment, the processing logic determines timbral features by computing Mel-frequency Cepstrum (MFC) from Short-Time Fourier Transform. Mel-frequency Cepstrum is a representation of a short-term power spectrum of a sound based on a linear cosine transform of a log power spectrum. In an embodiment, the processing logic generates timbral feature vectors using a time window of about 1 second with a hop size of about 25 milliseconds. The feature vectors may contain 20 MFCC's per window. In an embodiment liftering may be applied to the MFCC's to emphasize higher order MFCC's.

Referring back to FIG. 4A, at block 404 processing logic determines a beat for the unidentified media content item. In an embodiment, the feature identification logic 215 determines a rhythmic structure of the audio of the unidentified media content item using MFC from Short-Time Fourier Transform. The feature identification logic 215 may identify differences between successive MFC as beats. For example, differences in MFC over time may indicate an instance of a beat.

Figure 7A:
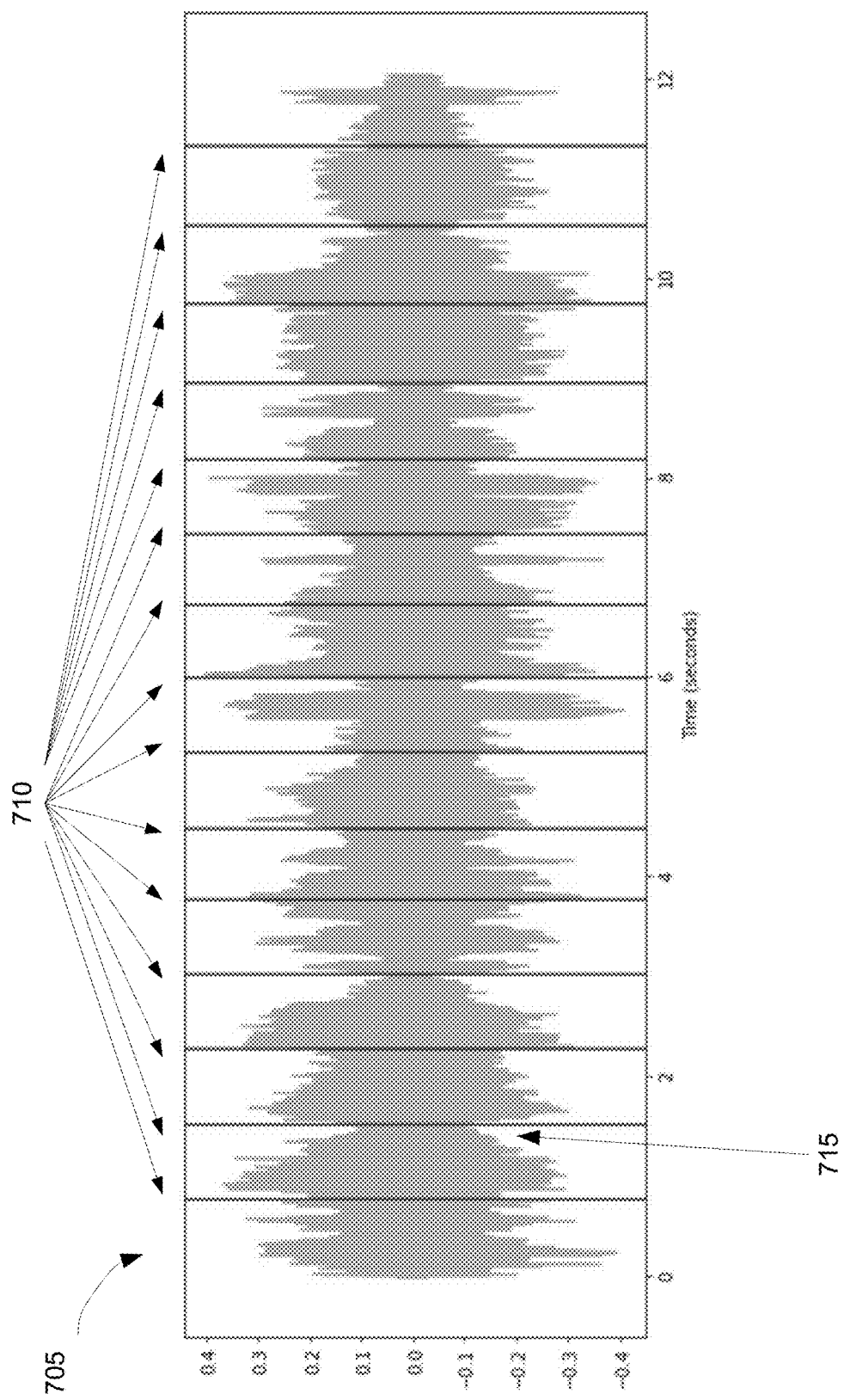
FIG. 7A illustrates Mel-frequency Cepstra over the duration of a time window for an unidentified media content item, according to an embodiment.

FIG. 7A illustrates an audio waveform overlaid with the location of beats. Graph 705 of FIG. 7A illustrates the audio waveform over a duration of 12 seconds. The horizontal axis represents the time and the vertical axis represents the sample value of audio waveform. Lines 710 each represent a beat location (e.g., where there is a relative change in intensity of the MFC). For example at location 715, such a change in the intensity of the MFC occurs, and is visible in the audio waveform as a change in the maximum of the sample values, from about 0.1 to about 0.25. The processing logic may determine, based on the intensity differences (e.g., in MFC), beat locations relative to the time within the time window.

Referring back to FIG. 4A, at block 406, processing logic divides the unidentified media content item into a plurality of segments. In an embodiment, the processing logic divides the unidentified media content item into a plurality of segments based upon the identified beat locations. For instance referring to FIG. 7A, the plurality of segments may be each of the time sections between the identified lines 710.

At block 408, processing logic normalizes a plurality of vectors within a set of segments to generate a normalized set of feature vectors that are tempo independent. By normalizing the feature vectors based upon beat, the processing logic is able to identify the different features within each beat of the unidentified media content item. When comparing the normalized feature vectors to normalized feature vectors of known media content items, similarities may be found even when the unidentified media content item and a known media content item have different tempos. For example, a fast hard rock cover version of the Beatles' Yesterday may have a very different beats per minute tempo than the original work of Yesterday. By comparing normalized feature vectors of each version of Yesterday, similarities between the audio features may be found.

In an embodiment, for feature vectors that represent timbral features, the processing logic identifies a set of consecutive segments and then aggregates the timbral feature vectors into an array. The processing logic then z-normalizes the array of timbral feature vectors and down-scales the number of timbral feature vectors. For example, if 20 segments make up the set of segments, the processing logic may down scale 10 vectors of 20 MFCC's to generate a 200-dimensional feature vector for a single beat. The result is a set of beat-synchronized MFCCs.

In an embodiment, processing logic may perform different types of scaling and normalization based on the type of feature vector. Chroma vectors may not be normalized; instead chroma vectors may be scaled down. The processing logic may take 20 beats worth of segments and scale down the chroma vectors. For example, the set of 20 segments may contain 40 vectors of 12 pitch classes, resulting in beat-synchronized chroma vectors containing a 480-dimensional feature vector per beat.

Different covers of original works may be performed using different instruments and using different vocal types. Beat-synchronization of timbral features may not capture similarities within these types of cover works. The feature identification logic 215 may compute blocks of self-similarity matrices (SSMs) of timbral features to normalize out the absolute timbral information, thereby leaving only relative changes. Capturing and comparing relative changes of timbral information may enable feature vector comparison to identify similarities between works that are performed in a vastly different manner than the original work. In an embodiment, the feature identification logic 215 may compute SSMs using the z-normalized beat-synchronized embedding of the MFCCs before down scaling occurs. Local SSMs may be derived by computing the Euclidean distance of each MFCC vector in the embedding to every other MFCC vector inside the 20-beat window. This may result in a large matrix which may then be scaled down, by interpolation, to a 50×50 upper-diagonal matrix and then flattened. The result is a set of beat-synchronized MFCC SSMs that include a 1250-dimensional feature vector per beat.

Figure 7B:
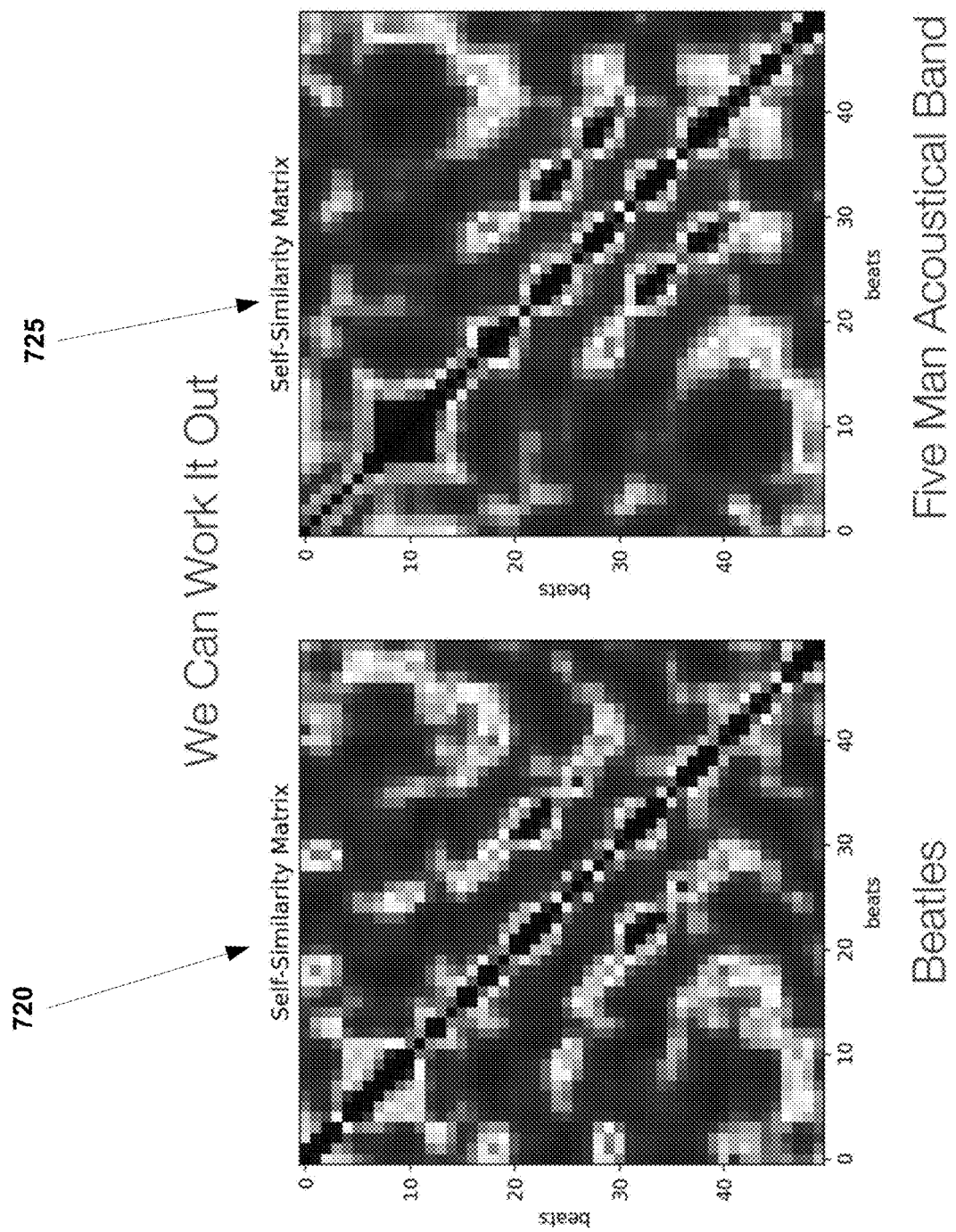
FIG. 7B illustrates an example of self-similarity matrices of beat-synchronized Mel-frequency Cepstral coefficients from a known media content item and a cover-media content item, according to an embodiment.

FIG. 7B illustrates an example of SSMs of beat-synchronized MFCCs from a known media content item and a cover-media content item. Graph 720 is an illustration of the known media content item "We Can Work It Out" by the Beatles. Graph 725 is an illustration of the cover-media content item "We Can Work It Out" by the Tesla from their album "Five Man Acoustical Jam." The cover-media content item performed by Tesla is a live performance performed using acoustic instruments. As shown by graph 720 and graph 725, the positional intensity of the feature vectors of each media content item illustrate a similarity, despite the cover-media content item being a live performance recording using acoustic instruments.

Referring to FIG. 4A, at block 410, processing logic determines whether there are any remaining beats within the unidentified media content item that require normalization. If there are remaining beats, processing logic then proceeds back to block 408 to repeat the process for the next beat. If there are no more remaining beats to be normalized, processing logic proceeds to block 412. At block 412, processing logic generates a set of normalized feature vectors from the generated feature vectors at block 408. For example, the set of normalized feature vectors may include multiple sets of feature vectors representing beat-synchronized chroma vectors, beat-synchronized MFCCs, and beat-synchronized MFCC SSMs. The generated set of features may be one or more digital fingerprints of the unknown media content item.

Referring back to FIGS. 3B-3C, at block 338 processing logic determines first similarities (referred to as audio and/or music similarities) between the second digital fingerprint(s) of the unidentified media content item and the second digital fingerprint(s) associated with multiple known media content items from a media content repository. In one embodiment, the music/audio similarities are computed for all known media content items. Alternatively, a set of known media content items for which lyrical similarity values met a criterion (e.g., exceeded a threshold) may have been determined (e.g., at blocks 326 and/or 330). In embodiments, the music/audio similarity scores are only determined with regards to those known media content items included in the set.

A music/audio similarity score or value may be determined for each comparison of the unidentified media content item to a known media content item.

In an embodiment, the processing logic (e.g., feature matching logic 225) may determine whether the unidentified media content item is similar to a known media content item by comparing the set of normalized feature vectors (digital fingerprint(s)) of the unidentified media content item, determined at block 336, to an additional set of normalized feature vectors (digital fingerprint(s)) for a known media content item. In an embodiment, the additional set of normalized feature vectors (digital fingerprints) for the known media content item may be pre-calculated and stored within storage 145A-145B. In another embodiment, the additional set of normalized features vectors (digital fingerprints) for a known media content item may be calculated using a similar method described by method 400 on-demand.

In an embodiment, comparing the set of normalized feature vectors (digital fingerprints) of the unidentified media content item to an additional set of normalized feature vectors (digital fingerprints) for a known media content item may include comparing sequences of beats from each of the sets of beat-synchronized feature vectors. Each of the sets of beat-synchronized chroma vectors, MFCCs, and MFCC SSMs from the unidentified media content item and the known media content item may be compared to generate three cross-similarity matrices (CSMs) for each feature type. CSMs for the MFCCs and the MFCC SSMs may be generated to include Euclidean distances between all possible pairs of feature vectors of the unidentified media content item and the known media content item.

In an embodiment, computing the CSM for the beat-synchronized chroma vectors between the unidentified media content item and a known media content item may be performed by computing the optimal transposition index (OTI), which may be used to handle a case where the unidentified media content item and a known media content item are in different keys. A mean of all chroma vectors in the unidentified media content item and a mean of all chroma vectors in the known media content item are generated. Then a correlation may be computed between the two for all possible rotations of the mean chroma of the unidentified media content item. The transposition that maximizes the correlation may then then be used to rotate all the chroma vectors in the unidentified media content item. Then the CSM for the beat-synchronized chroma vectors includes the cosine distance between all possible pairs of feature vectors of the unidentified media content item and the known media content item.

In an embodiment, SSMs may additionally be calculated for each feature type in the unidentified media content item and the known media content item, thus resulting in three CSMs between unidentified media content item and the known media content item and six SMMs. In an embodiment, the SSMs and CSMs for the unidentified media content item and the known media content item are then fused using a Similarity Network Fusion (SNF) method. Then for each feature type, a block matrix may be constructed. In an example, within each block matrix, the upper-left block is the SSM for the unidentified media content item, the lower-right block is the SSM for the known media content item and both the upper-right block and the lower-left block is the CSM for the specific feature type, appropriately transposed. This results in three matrices.

In an embodiment, the processing logic may execute an iterative SNF process on each of the three matrices, resulting in one large fused block matrix. Within the large fused block matrix, the upper-right block is the final fused CSM comparing the unidentified media content item and the known media content item using all feature types.

In an embodiment, a binary cross-recurrence plot (CRP) is computed by setting those locations to one which corresponds to the closest 10% of values in each row and column of the CSM. The result may be a matrix, which a Smith-Waterman algorithm may be applied to produce a final feature similarity score.

Figure 7C:
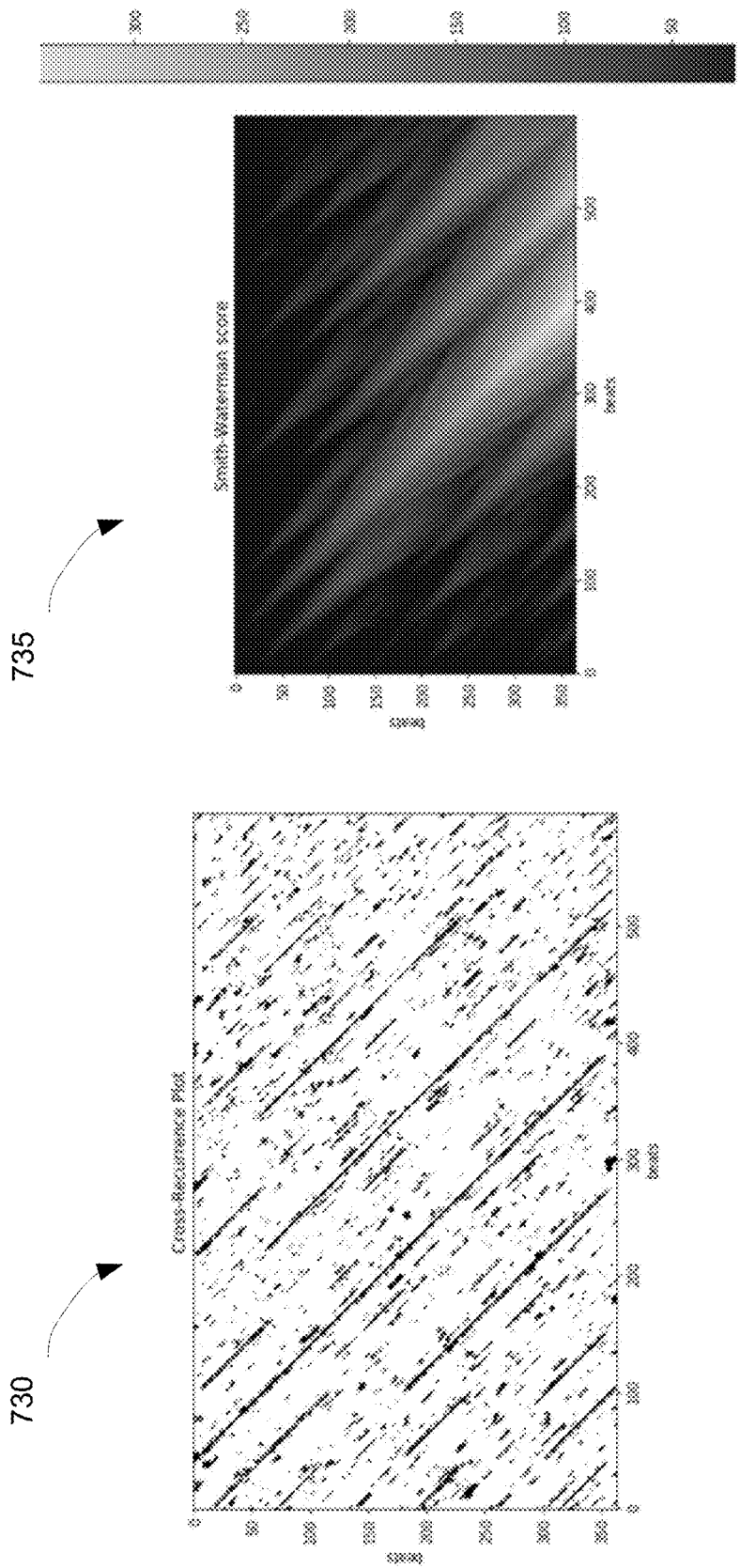
FIG. 7C illustrates an example of a cross-recurrence plot and a Smith-Waterman score for an unidentified media content item and a known media content item that are similar, according to an embodiment.
Figure 7D:
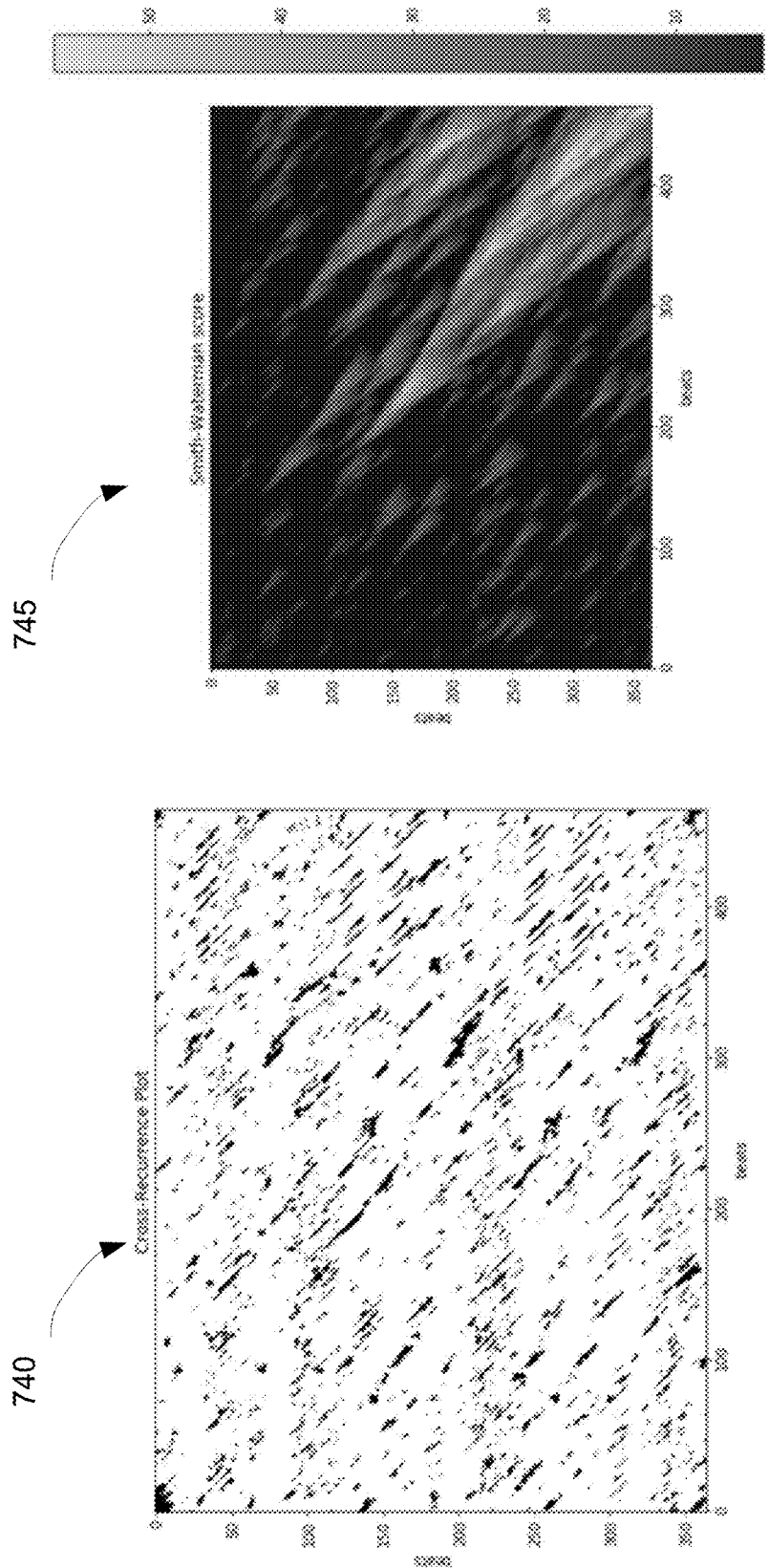
FIG. 7D illustrates an example of a cross-recurrence plot and a Smith-Waterman score for an unidentified media content item and a known media content item that are not similar, according to an embodiment.

FIGS. 7C-D illustrates examples of CRPs and Smith-Waterman scores for a known media content item compared to a matched unidentified media content item and a not matched unidentified media content item. Graphs 730 and 740 represent the CRPs for a matched unidentified media content item and a not matched unidentified media content item, respectively. The y-axis of the graphs 730 and 740 represents beats from the known media content item and the x-axis represents beats from the unidentified media content item. Graph 730 shows matching beat locations in several places as long diagonals. The long diagonals represent matching features that are in lockstep beat-by-beat. In contrast, the no-match graph 740 does not show clear diagonals meaning that the beat-by-beat comparisons of features do not match. Graphs 735 and 745 represents the Smith-Waterman scoring results for graphs 730 and 740 respectively. The y-axis represents beats from the known media content item and the x-axis represents beats from the unidentified media content item. The lighter intensities, within graphs 735 and 745, represent higher match scores while the darker intensities represent lower match scores. Graph 735 of the matched unidentified media content item shows more consistent lighter intensities resulting in a higher overall Smith-Waterman score and a matching unidentified media content item. Conversely, graph 745 of the not matched unidentified media content item shows less consistent lighter intensities resulting in a lower overall Smith-Waterman score and a not matching unidentified media content item.

In an embodiment, a configured feature vector similarity threshold may be used to determine whether a similarity exists between the unidentified media content item and the known media content item.

Due to the complexity of determining the music/audio similarity between the feature vectors of unidentified media content item and the known media content item, a subset of known media content items having lyrical similarity scores that satisfy one or more criteria may be determined at blocks 326 and/or 330 and may be used to narrow the set of known media content items compared to determine the music/audio similarity. In another embodiment, the lyrical similarity scores between the unidentified media content item and each of the known media content items may be used to sort the known media content items into a sorted list based on lyrical similarity. The sorted list of known media content items may be compared for a music/audio similarity of feature vectors in sequential order, such that when a similarity and a subsequent match is determined, the process may end resulting in an identification of a media content item as a cover of a known work.

At block 340, processing logic optionally determines metadata associated with the unidentified media content item. In an embodiment, the metadata identification logic 225 extracts the available metadata from the unidentified media content item. For example, metadata containing textual descriptions may include, but are not limited to, song title, artist, album, year published, year recorded, comments, track number, genre, and so on. In one embodiment, processing logic of a first computing device (e.g., computing device 101A) determines the metadata. Alternatively, processing logic of server computing device 150 may determine the metadata.

At block 342, processing logic optionally determines second similarities (referred to as metadata similarity) between the metadata associated with the unidentified media content item and additional metadata associated with known media content items from the media content repository. A metadata similarity score or value may be determined for each comparison of the unidentified media content item to a known media content item. In an example, the metadata matching logic 225 may retrieve additional metadata as normalized text of the known media content item from storage and determine whether there is a similarity between the additional metadata and the metadata associated with the identified media content item.

Figure 4B:
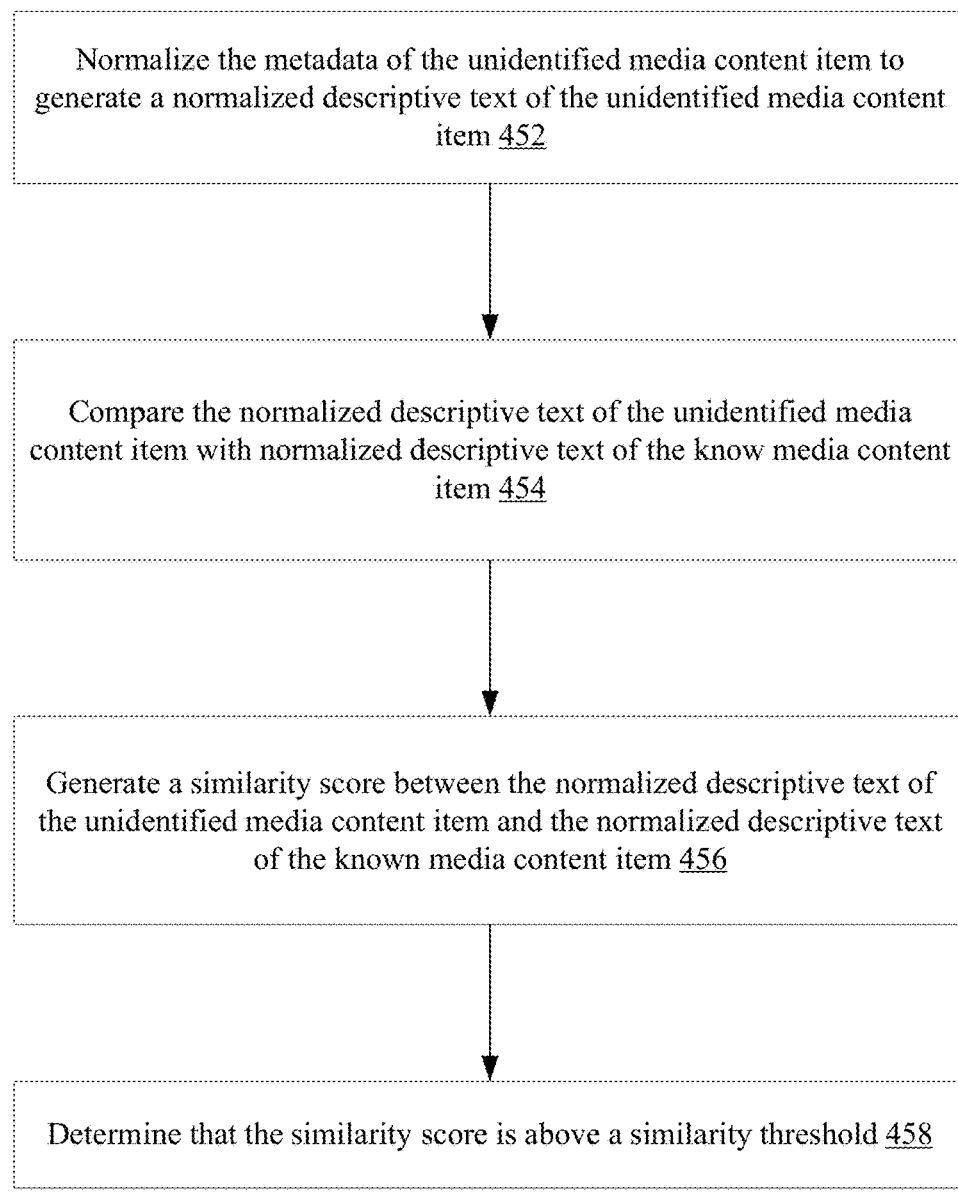
FIG. 4B is a flow diagram illustrating a method for determining whether there is a similarity between metadata of an unidentified media content item and a known media content item, according to an embodiment.

FIG. 4B is a flow diagram illustrating a method 450 for determining whether there is a similarity between metadata of an unidentified media content item and a known media content item. At block 452, the metadata matching logic 225 may normalize the descriptive text from the metadata of the unidentified media content item. Textual normalization may improve the probability of determining a match between the unidentified media content item and a known media content item when both texts have been normalized.

At block 454, processing logic may compare the normalized descriptive text of the unidentified media content item to normalized text of a known media content item. In an embodiment, the normalized text of a known media content items may be generated from textual descriptions from metadata extracted from known media content items. In an embodiment, the normalized descriptive text of the unidentified media content item may be compared to the normalized text of the known media content item of a plurality of known media content items 147A-147B. The normalized text of the known media content items may be indexed in order to increase search and comparison efficiency. In an embodiment, storage 145D may contain an inverted index (metadata index 151) of normalized words and trigrams of the normalized text of the known media content items.

At block 456, processing logic may generate a metadata similarity score between the normalized descriptive text of the unidentified media content item and the normalized descriptive text of a known media content item. In an embodiment, when generating a similarity score, the metadata matching logic 230 may determine a match count by counting the number of words and/or trigrams that match between the normalized descriptive texts of the unidentified media content item and of the known media content item. Since normalized descriptive text from the unidentified media content item and the known media content item may spell whole words differently, the trigram matching may be beneficial in identifying matches that may otherwise be missed when only comparing whole words. After identifying a match count, the metadata matching logic 230 may determine a match score as a percentage of the normalized text matched. For example, the metadata matching logic 230 may divide the match count by the greater of the number of words in either the unidentified media content item or from the known media content item to generate a match percentage score.

In an embodiment, the processing logic (e.g., metadata matching logic 230) may perform the comparison and generation of a similarity score for the plurality of known media content items to generate a similarity score for each of the plurality of known media content items.

At block 458, processing logic may determine that the metadata similarity between the unidentified media content item and a known media content item is above a similarity threshold. The similarity threshold may be a configured threshold determined by a test set of data to indicate whether descriptive text from metadata is similar. For example, if the similarity threshold is set at 70 out of 100, then similarity score above the threshold would indicate a likelihood of a match based upon a 70% similarity in descriptive text between the unidentified media content item and a known media content item. In an embodiment, the similarity threshold may be used to generate a subset of known media content items from the plurality of known media content items that are above the similarity threshold. The subset of known media content items may then be used to narrow the number of known media content items compared to the unidentified media content item using the normalized set of feature vectors, thereby reducing overall processing time to identify the unidentified media content item.

Returning back to FIGS. 3B-3C, at block 344, processing logic determines, for one or more known media content items, a combined similarity value or score based on a combination of the lyrical similarity, the first similarity (e.g., music/audio similarity) and/or the second similarity (e.g., metadata similarity) associated with those known media content items. Similarity values may be combined using SNF techniques as previously described, using unweighted combinations of the similarity values, using weighted combinations of the similarity values, or using some other combination techniques. For example, each of the similarity scores may be normalized and then multiplied together to generate a combined similarity score. In yet other embodiments, the combinations of the similarity scores may be linear, non-linear, or may use any other weight calculation algorithm.

In one embodiment, processing logic determines timing information of at least one of words or phonemes in the lyrical content associated with the unidentified media content item and generates a first cross-similarity matrix between words or phonemes at timing offsets from the unidentified media content and additional words or additional phonemes at additional timing offsets from the known media content item. Processing logic additionally determines one or more musical features representing at least one of pitch, timbre or rhythm from the media content item and generates, for at least one of the one or more musical features, an additional cross-similarity matrix between the musical features at timing offsets from the unidentified media content item and additional musical features at additional timing offsets from the known media content item. Processing logic then determines a similarity score between the unidentified media content item and the known media content item based on the first cross-similarity matrix and the additional cross-similarity matrix.

At block 346, processing logic determines whether the combined similarity value or score meets or exceeds a similarity threshold. If so, then the method continues to block 349 and processing logic identifies the unidentified media content item as a cover of a known media content item for which the combined similarity value met or exceeded the similarity threshold. Otherwise, the method proceeds to block 348, and processing logic determines that the unidentified media content item is not a cover of any known media content item.

In an alternative embodiment, processing logic (e.g., the cover identification logic 235) may separately determine whether a lyrical similarity score exceeds a first threshold, a music/audio similarity score exceeds a second threshold and/or whether a metadata similarity score exceeds a third threshold. If two similarity thresholds are exceeded then the cover identification logic 235 may identify the unidentified media content item as a cover of the known media content item. Alternatively, if all similarity thresholds are exceeded then the cover identification logic 235 may identify the unidentified media content item as a cover of the known media content item.

In an embodiment, the strength of the lyrical similarity may be used to determine the similarity threshold for the music/audio similarity and/or the metadata similarity, and vice versa. If the any of the similarities has a very high score, then the other similarity thresholds may be lowered. For example, if the lyrical similarity value is very high (e.g., there is a high lyrical similarity to Beatles Yesterday), then it is highly like that the unidentified media content item is a cover of the known media content item Beatles Yesterday. In order to ensure that the cover may be matched, the audio/music similarity threshold may be lowered to account for the musical differences in the two media content items.

Figure 3D:
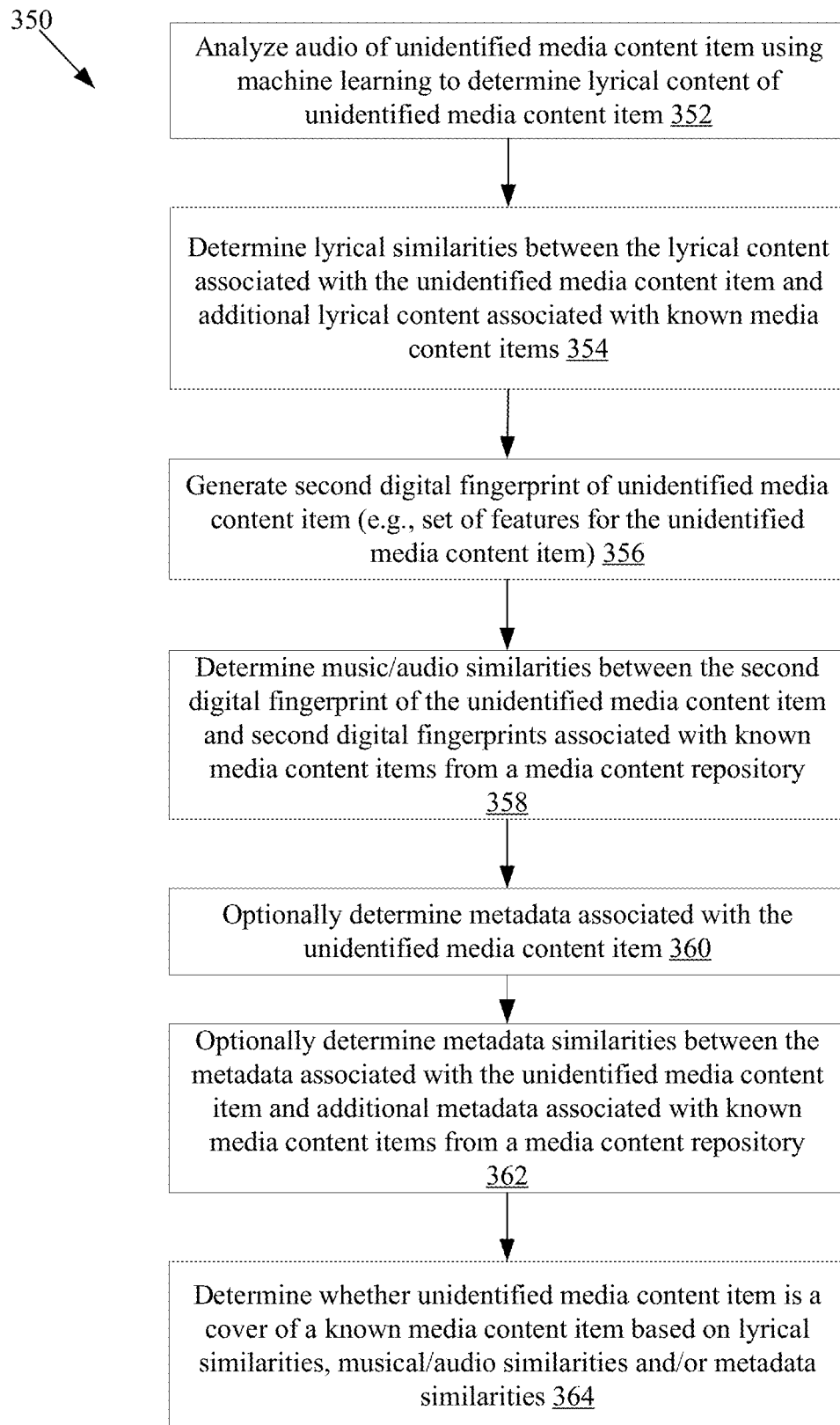
FIG. 3D illustrates a flow diagram illustrating a method for determining an unidentified media content item as cover of a known media content item, in accordance with an embodiment.

FIG. 3D is a flow diagram illustrating method 350 for determining whether an unidentified media content item is a cover of a known media content item. In some embodiments, method 350 is performed after method 300. Alternatively, method 350 may be performed after receiving an unidentified media content item, and without first performing method 300.

At block 352, processing logic analyzes audio of the unidentified media content item using machine learning (e.g., ASR) to determine lyrical content of the unidentified media content item. The lyrical content that is output may be a textual representation and/or a phonetic representation of the lyrics/words transcribed from the audio. In one embodiment, a call is made to a third party audio transcription service to perform the operations of block 352. The audio transcription service may then provide a response that includes the lyrical content as text and/or phonemes.

At block 354, processing logic compares the lyrical content of the unidentified media content item to lyrical content of a plurality of known media content items. Based on the comparison, processing logic determines lyrical similarities (e.g., lyrical similarity scores or values) between the lyrical content associated with the unidentified media content item and additional lyrical content associated with the various known media content items.

At block 356, processing logic generates a second digital fingerprint (or multiple second digital fingerprints) of the unidentified media content item. For example, the unidentified media content item may be divided into segments, and second digital fingerprints may be generated of each of the segments. The second digital fingerprint(s) may be similar to the first digital fingerprint(s), but may focus on different combinations of features/feature vectors. Generating the second digital fingerprint(s) may include generating a plurality of feature vectors for the unidentified media content item. For example, processing logic may determine a set of feature vectors based upon audio features including, but not limited to, pitch, timbre, and rhythm.

At block 358, processing logic determines audio and/or music similarities (e.g., audio/music similarity scores or values) between the second digital fingerprint(s) of the unidentified media content item and the second digital fingerprint(s) associated with multiple known media content items from a media content repository.

At block 360, processing logic optionally determines metadata associated with the unidentified media content item.

At block 362, processing logic optionally determines metadata similarities (e.g., metadata similarity scores and/or values) between the metadata associated with the unidentified media content item and additional metadata associated with known media content items from the media content repository.

At block 364, processing logic determines whether the unidentified media content item is a cover of a known media content item based on one or more of the lyrical similarity, the musical/audio similarity and the metadata similarity between the unidentified media content item and that known media content item. There are different types of covers, and different ones or combinations of the various computed similarities may be used to identify such different types of covers. For example, if a cover reused the lyrics and the harmony/melody of a known media content item, then the lyrical similarity and the music/audio similarity (and optionally the metadata similarity) may be used to identify the unidentified media content item as a cover of the known media content item. However, if the cover is an instrumental cover or is in a different language than the known media content item, then the music/audio similarity (and optionally the metadata similarity) may be used to identify the unidentified media content item as a cover of the known media content item. In another example, if the cover reused the lyrics of the known media content item but applied those lyrics to a different melody/harmony, then the lyrical similarity (and optionally the metadata similarity) may be used to identify the unidentified media content item as a cover of the known media content item.

Different criteria may be used for identifying the different types of covers. For example, to identify a cover that only includes lyrics of a known media content item, then a relatively high threshold (e.g., an 80% match) may be used for the lyrical similarity. In other words, if there is a very low audio/music similarity score, then the lyrical similarity should meet or exceed a higher similarity threshold (e.g., an 80% match) in order for the unidentified media content item to be identified as a cover of a known media content item. Similarly, if there is a very low lyrical similarity score, then the audio/music similarity score should meet or exceed a higher similarity threshold in order for the unidentified media content item to be identified as a cover of a known media content item. However, the lyrical similarity threshold may be reduced with increases in the audio/music similarity score, and the music/audio similarity threshold may be reduced with increases in the lyrical similarity score. For example, if the lyrical similarity is at least 50% and the music/audio similarity is at least 50%, then a match may be identified.

In embodiments, a final match score or combined similarity score is determined for each known media content item to which the unidentified media content item is compared, as described in further detail hereinabove.

In some instances, a single unidentified media content item may be a cover of multiple different known media content items (e.g., such as in a mashup). In embodiments processing logic is able to identify that the unidentified media content item is a cover of multiple known media content items. For example, multiple known media content items may have high combined similarity scores.

In one embodiment, processing logic returns a single result of a known media content item that is a closest match to the unidentified media content item. Alternatively, processing logic may return multiple results of known media content items. The multiple results may be, for example, a set number of known media items with the highest combined similarity scores or all or a set number of known media items with a combined similarity scores that exceed a threshold.

Figure 3E:
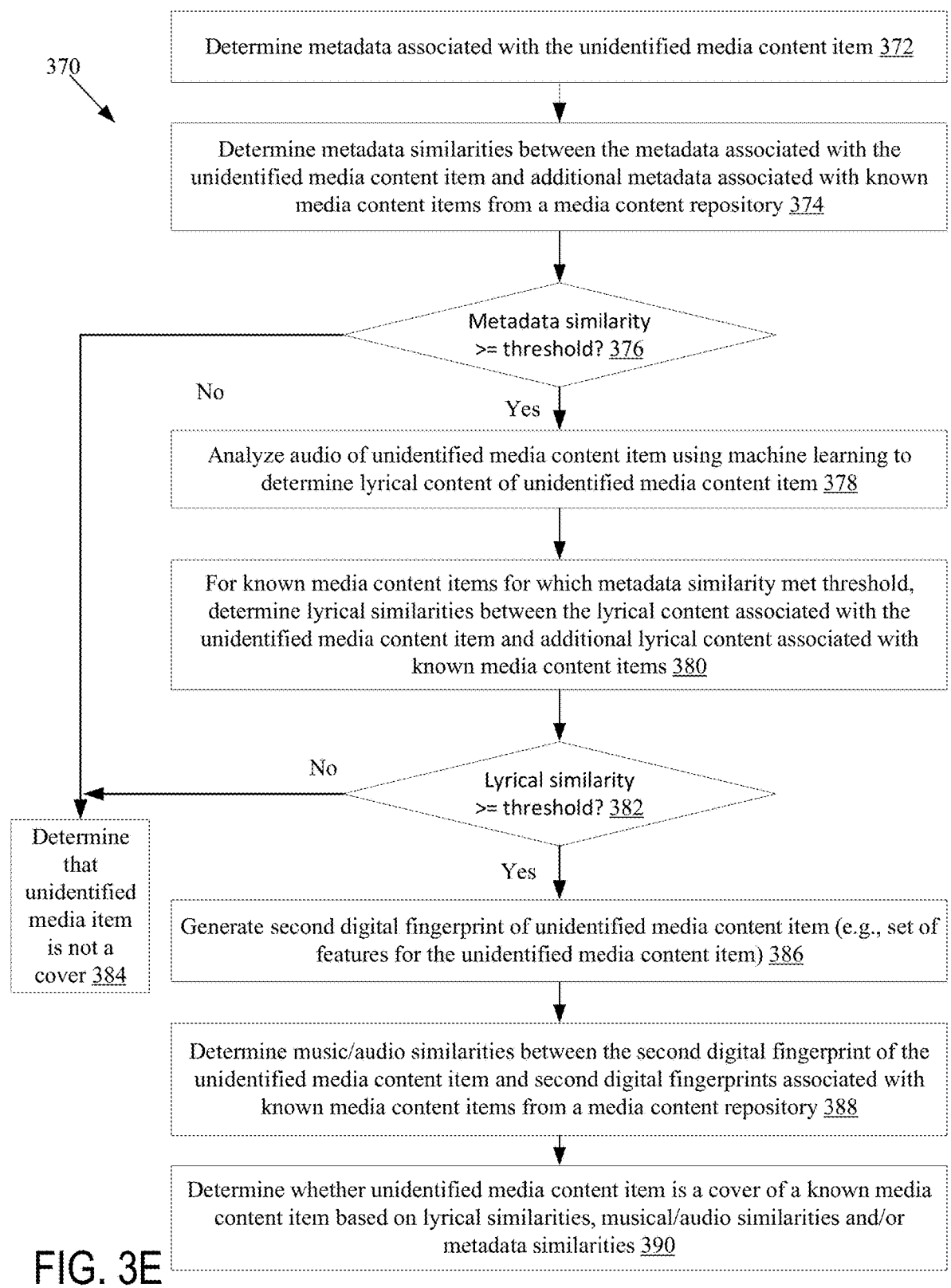
FIG. 3E illustrates a flow diagram illustrating a method for determining an unidentified media content item as cover of a known media content item, in accordance with another embodiment.

FIG. 3E is a flow diagram illustrating method 370 for determining whether an unidentified media content item is a cover of a known media content item. In some embodiments, method 370 is performed after method 300. Alternatively, method 370 may be performed after receiving an unidentified media content item, and without first performing method 300.

At block 372, processing logic determines metadata associated with the unidentified media content item.

At block 374, processing logic determines metadata similarities (e.g., metadata similarity scores and/or values) between the metadata associated with the unidentified media content item and additional metadata associated with known media content items from the media content repository.

At block 376, processing logic determines whether the metadata similarity meets or exceeds a metadata similarity threshold. If so, the method continues to block 378. Otherwise, the method continues to block 384.

At block 378, processing logic analyzes audio of the unidentified media content item using machine learning (e.g., ASR) to determine lyrical content of the unidentified media content item. The lyrical content that is output may be a textual representation and/or a phonetic representation of the lyrics/words transcribed from the audio. In one embodiment, a call is made to a third party audio transcription service to perform the operations of block 352. The audio transcription service may then provide a response that includes the lyrical content as text and/or phonemes.

At block 380, processing logic compares the lyrical content of the unidentified media content item to lyrical content of a plurality of known media content items for which the metadata similarity met or exceeded the similarity threshold. Based on the comparison, processing logic determines lyrical similarities (e.g., lyrical similarity scores or values) between the lyrical content associated with the unidentified media content item and additional lyrical content associated with the various known media content items. By limiting the number of known media items for which lyrical similarity is determined to those with high metadata similarity scores, a total amount of computation may be reduced.

In one embodiment, at block 382 processing logic compares the lyrical similarity to a threshold, which may be the same threshold used at block 376 or a different threshold. Processing logic determines whether the lyrical similarity meets or exceeds a lyrical similarity threshold. If so, the method continues to block 386. Otherwise, the method may continue to block 384.

At block 384, processing logic determines that the unidentified media content item is not a cover of a known media content item.

At block 386, processing logic generates a second digital fingerprint (or multiple second digital fingerprints) of the unidentified media content item. For example, the unidentified media content item may be divided into segments, and second digital fingerprints may be generated of each of the segments. The second digital fingerprint(s) may be similar to the first digital fingerprint(s), but may focus on different combinations of features/feature vectors. Generating the second digital fingerprint(s) may include generating a plurality of feature vectors for the unidentified media content item. For example, processing logic may determine a set of feature vectors based upon audio features including, but not limited to, pitch, timbre, and rhythm.

At block 388, processing logic determines audio and/or music similarities (e.g., audio/music similarity scores or values) between the second digital fingerprint(s) of the unidentified media content item and the second digital fingerprint(s) associated with multiple known media content items from a media content repository for which the lyrical similarity met or exceeded the lyrical similarity threshold. By limiting the number of known media items for which music/audio similarity is determined to those with high metadata similarity scores and high lyrical similarity scores, a total amount of computation may be reduced. However, excluding from consideration those known media content items for which lyrical similarity failed to meet the lyrical similarity threshold may cause some types of covers to be missed. Accordingly, in an alternative embodiment the operations of block 382 are omitted, and at block 388 processing logic determines music/audio similarities between the unidentified media content item and all known media content items for which the metadata similarity met or exceeded the similarity threshold.

At block 390, processing logic determines whether the unidentified media content item is a cover of a known media content item based on one or more of the lyrical similarity, the musical/audio similarity and the metadata similarity between the unidentified media content item and that known media content item.

Figure 5A:
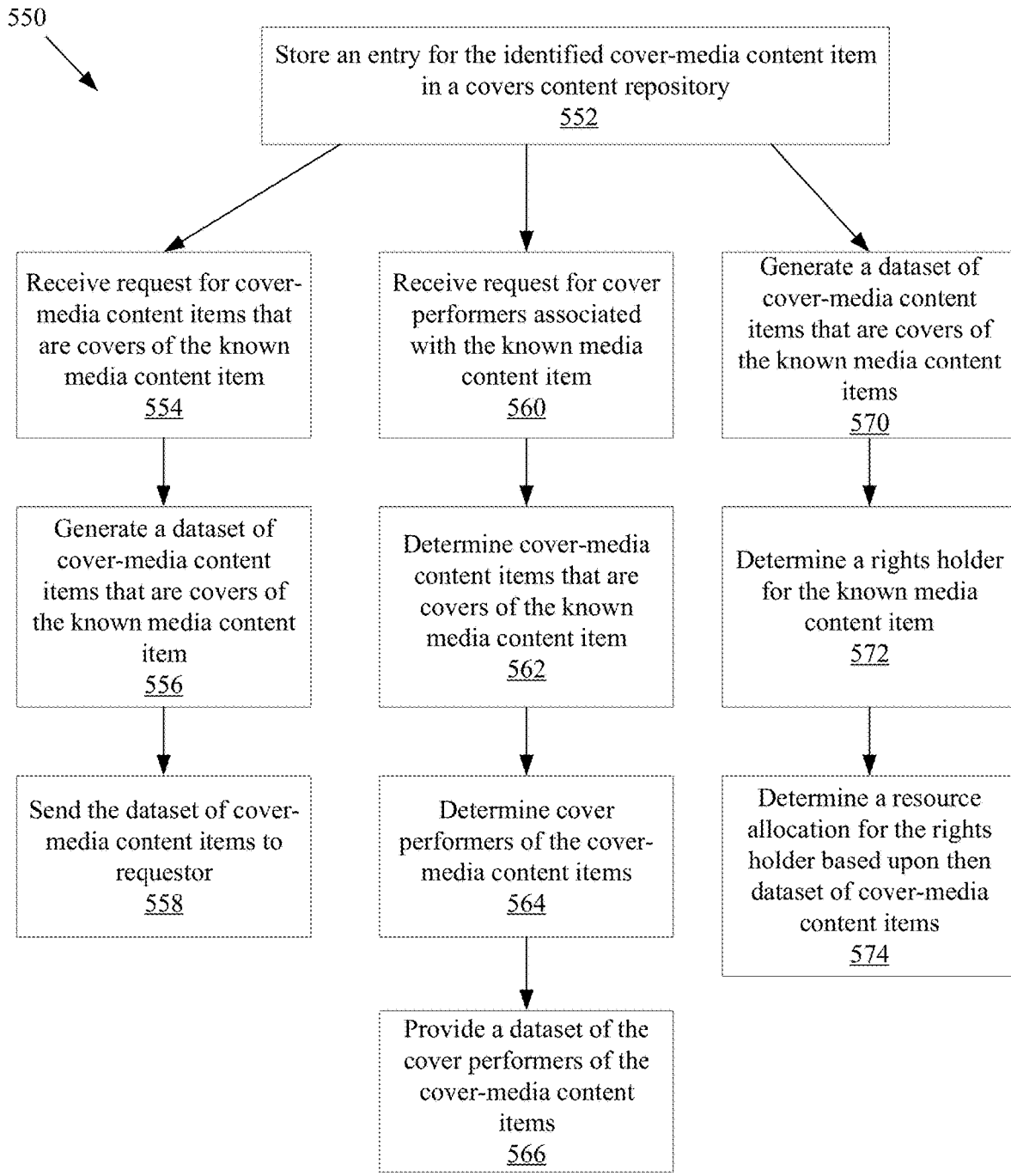
FIG. 5A is a flow diagram illustrating a method for storing an identified cover-media content item, and for receiving and processing multiple cover-media requests, according to an embodiment.

FIG. 5A a flow diagram illustrating method 550 for storing the identified cover-media content item, receiving and processing multiple cover-media requests. At block 552, processing logic stores an entry for the identified cover-media content item in a cover content repository. In an embodiment, the media classifier 152 may store the identified cover-media content item as a cover media content item 149 within storage 145E. The stored cover-media content item 149 may include data that links the cover-media content item to the known media content item. In an embodiment, the media classifier 152 may be configured to determine, based upon training data of different musical genres, a genre to assign to the stored cover-media content item. For example, the media classifier 152 may implement machine learning models with training data to detect and identify the type of musical genre to assign to the stored cover-media content item. In other embodiment, the metadata of the stored cover-media content item may already include a genre description, which may then cause the media classifier 152 to verify the genre description using the machine learning model.

The cover-media content items 149, stored within storage 145E, may include relationships between the cover-media content items 149 and their corresponding known media content items 147A-147B. In an embodiment, an index may be used to maintain the relationships and enable search capabilities between the relationships. As such, the cover-media content items 149 may be used as a cover repository for searching and compiling sets of cover-media content items for known media content items. For example, users, media content sharing platform owners, and publishers may be able to query and compile lists of cover songs for original works such as a list of covers of the Rolling Stones' Gimme Shelter.

At block 554, processing logic may receive a request for cover-media content items that are covers of a known media content item. In an embodiment, the cover search logic 166 may receive the request. The request may include an identifier that identifies the known media content item. In an embodiment, the request may also include filtering options such as a specified genre of cover-media content items. For example, the request may include the known media content item of The Beatles, Yesterday and filter criteria requesting all cover-media content items that are of the Hard Rock genre. The cover search logic 166 may query cover-media content items 149 for associated cover media content items that are covers of the known media content item. If the request included filter criteria for a specific genre, then the cover search logic 166 may focus the query on cover-media content items 149 of the specified genre. In another embodiment, the request may include filter criteria specifying genres the requestor wishes to exclude. In this scenario, the cover search logic 166 may focus the query on cover-media content items 149 that are of a genre other than the one(s) specified in the request.

At block 556, processing logic may generate a dataset of cover-media content items that are covers of the known media content item. The generated dataset of cover-media content items may be based on the request criteria, including filtering options. At block 558, processing logic may send the dataset of cover-media content items back to the requestor.

The cover-media content items 149 may also be queried to determine specific performers. For example, a cover artist may have uploaded, or have uploaded on his behalf, one or more cover-media content items to the media content sharing platform 175A-175B. Queries for specific performers may be beneficial for discovering new performers.

Referring back to FIG. 5A, at block 560 processing logic may receive a request for cover performers associated with known media content items. Identification of cover performers would be stored within metadata of the cover-media content items 149. At block 562, processing logic may determine cover-media content items that are covers of the known media content item. In an embodiment, cover search logic may query the cover-media content items 149 for all related cover-media content items that are covers of the known media content item provided in the received request.

At block 564, processing logic may determine cover performers of the cover media content items. In an embodiment, the cover search logic may extract the cover performers from metadata in the cover-media content items. At block 566, processing logic may provide a dataset of cover performers of the cover-media content items to the requestor. The dataset of cover performers may be a long list of performers depending on the known media content item and how many different cover-media content items exist. In an embodiment, the request for cover performers may also include a filter for the top cover performer. For example, the request may specify a list of the top 10 cover performers, or any other sample size. The cover search logic 166 may then select a subset of the top cover performers based upon the requested specification. For instance, if the request specified the top 10 cover performers, then the subset would include only the top ten cover performers. In an embodiment, the cover search logic 166 may be configured to determine the top cover performers based upon one or more performer metrics including the number of cover-media content items associated with a specific performer and/or a total number of views of the cover-media items associated with the specific performer. Other metrics may be temporally based, such as the cover performers from the last week or month. In other embodiments, the request to the cover search logic 166 may include the type of performer metrics to be used. At block 566, processing logic provides a dataset of the cover performers of the cover-media content items to the requestor.

Similar to resource allocation methods described in method 580, resource allocations for rights holders may be calculated for cover-media content items 149 stored on the storage 145E. At block 570, processing logic may generate a dataset of cover-media content items that are covers of a known media content item. At block 572, processing logic determines a publishing right holder of the known media content item. In an embodiment, licensing logic 162 may be invoked to determine a publishing rights holder of the known media content item. The licensing logic 162 may query the storage 145A-145B or other storages, local or remote, for the publishing rights holder information.

At block 574, processing logic determines a publishing resource allocation for the identified cover-media content item. In an embodiment, the licensing logic 162 may calculate, based upon publishing rights holder information which may include licensing and/or royalty fees for published cover-media content items.

Figure 5B:
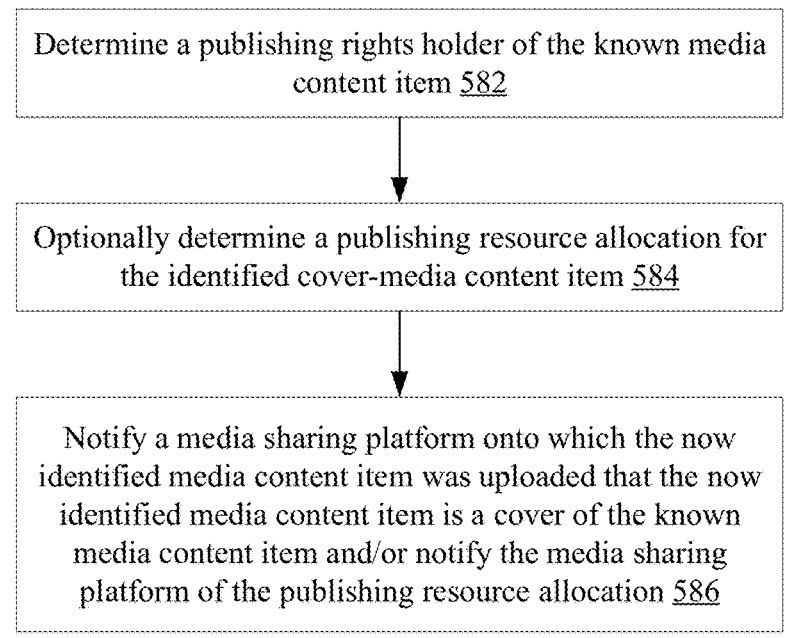
FIG. 5B is a flow diagram illustrating a method of notifying a media content sharing platform of a cover-media content item stored thereon, in accordance with another embodiment.

FIG. 5B is an embodiment of a flow diagram illustrating method 580 of notifying a media content sharing platform of a cover-media content item stored thereon. After receiving an unidentified media content item by the communication logic 164 and determining that the unidentified media content item is music and whether the unidentified media content item is a copy of an original work, method 380 may be performed.

At block 582, processing logic determines a publishing rights holder (or multiple publishing rights holders) of a known media content item of which a cover-media content item is a cover.

In an embodiment, licensing logic 162 may be invoked to determine a publishing rights holder of the known media content item. Publishing rights holder information may be stored along with the known media content items 147A-147B within storage 145A-145B or may be stored in another storage location. The licensing logic 162 may query the storage 145A-145B for the publishing rights holder information. Alternatively, the licensing logic 162 may query other storages or other sources, including external sources to determine the publishing holder rights information. In other embodiments, licensing logic 162, within the server computing device 150 may be invoked to determine the publishing rights holder information of the known media content item.

At block 584, processing logic determines a publishing resource allocation for the identified cover-media content item. In an embodiment, the licensing logic 162 may calculate, based upon publishing rights holder information which may include licensing and/or royalty fees for published cover-media content items. The publishing resource allocation may be calculated based upon the publishing rights holder information. In an embodiment, if the identified cover-media content item is a cover of two or more known media content items, then licensing logic 162 may calculate a percentage based allocation between the two or more known media content items. The percentage based allocation may be based upon the percentage of the identified cover-media content item that matches each of the two or more known media content items.

In an embodiment, licensing and/or royalty fees may differ depending on whether the cover-media content item has been upload by an amateur artist or officially released by a label and/or publisher.

At block 586, processing logic notifies a media sharing platform onto which the now identified media content item (which is a cover-media content item) was uploaded that the cover-media content item is a cover of a known media content item and/or notifies the media sharing platform of the publishing resource allocation.

Figure 7E:
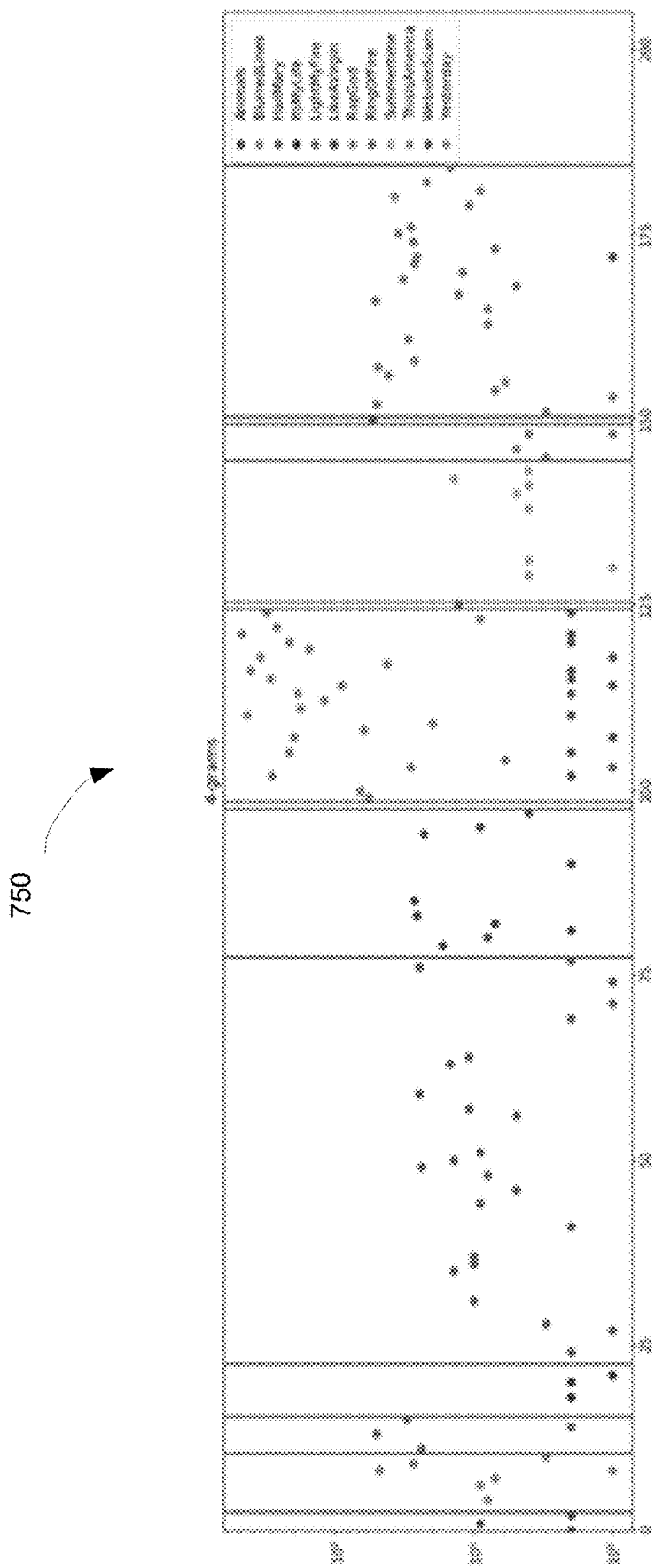
FIG. 7E is an example plot showing experimental data of lyrical similarity values between cover-media content items and known media content items of which the cover-media content items are covers.

FIG. 7E is an example plot 750 showing experimental data of lyrical similarity values between cover-media content items and known media content items of which the cover-media content items are covers. This data was generated using a prototype system using an English speech-to-text system and a variety of methods for matching the unknown lyrics. In the plot 750 shown, the x-axis is simply a numeric identifier attached to each unknown, and the y-axis is a score. Note that the y-axis is a log scale.

Each marked region in the plot 750 is associated with a set of covers of one of the references in the legend on the right, except that the one small region around x=100 is an unknown for which there wasn't a reference in the database. The order of the regions is the same as the order in the legend.

The score is simply the count of exactly matching 4-grams (a matching sequence of 4 words). Unknowns where the counts of matching 4-grams is zero are not shown. The matching counts get very large for the compositions with more lyrics—in this case rap compositions. It's easy to see that the system works and that the biggest entries in each region are associated with the proper reference.

There are some unknowns where the score is zero. This is due to:
a) The cover is in another language—in this case Finnish and French
b) The cover is a parody—in this case two Weird Al versions
c) The cover is an instrumental cover—there were several of these.
d) For a small number, the speech-to-text system didn't produce much of a transcription, as speech-to-text systems are still not perfect, especially for sung voice, and especially for the case of music, where there is a lot of competing sound.

Figure 8:
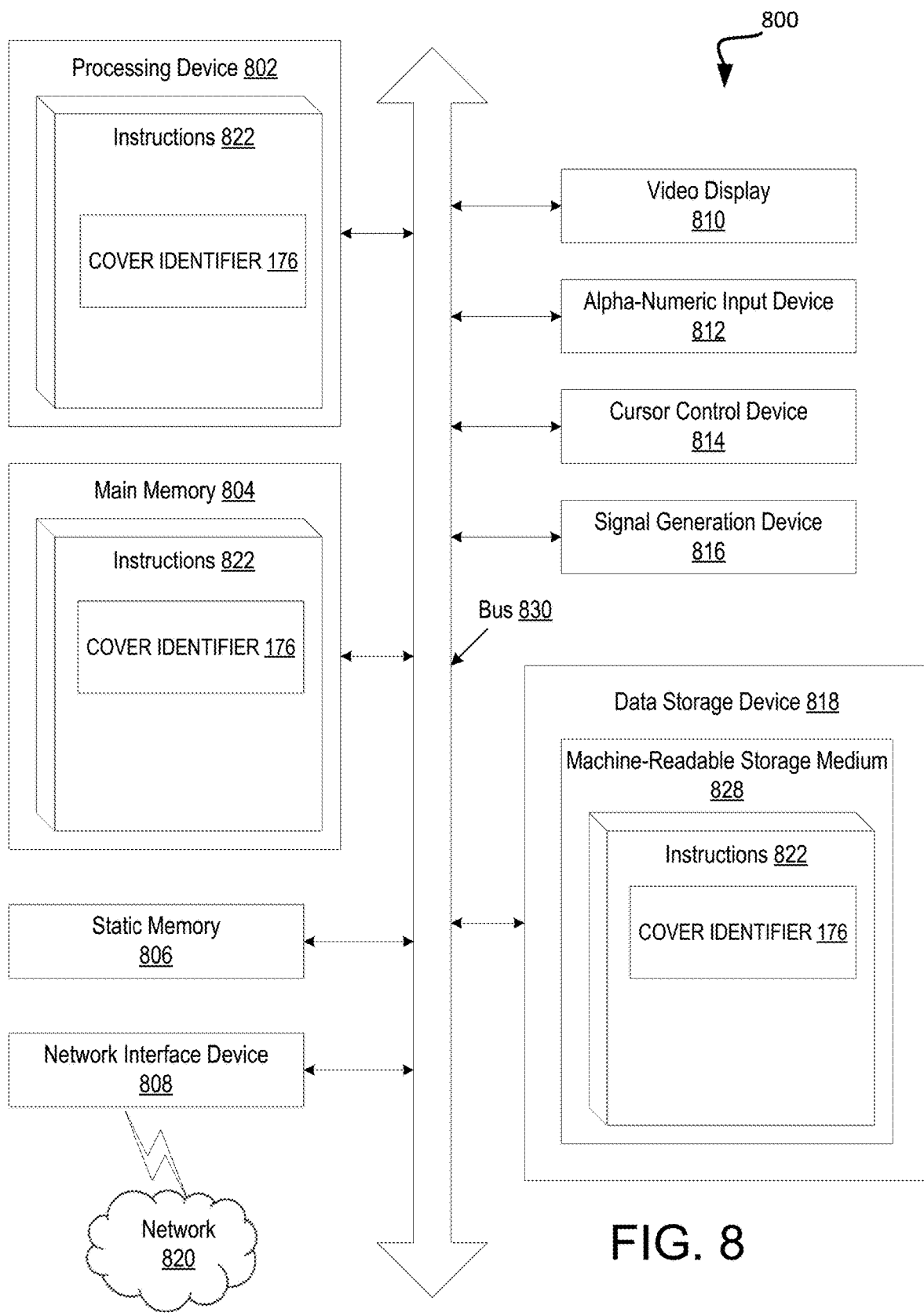
FIG. 8 is a block diagram illustrating an exemplary computer system, according to an embodiment.

FIG. 8 illustrates a diagrammatic representation of a machine in the exemplary form of a computing device 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server computing device, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computing device 800 may represent computing devices 101A-B, and/or server computing device 150, as shown in FIG. 1.

The computing device 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the cover identifier 176 for performing the operations and steps discussed herein.

The computing device 800 may further include a network interface device 808. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions 822 (e.g., instructions of cover identifier 176) embodying any one or more of the methodologies or functions described herein. The instructions 822 may also reside, completely or at least partially, within the main memory 804 and/or within processing logic 826 of the processing device 802 during execution thereof by the computer system 800, the main memory 804 and the processing device 802 also constituting computer-readable media. The instructions may further be transmitted or received over a network 820 via the network interface device 808.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. In addition, embodiments of the present disclosure are not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving an unidentified media content item;
   determining lyrical content associated with the unidentified media content item, wherein the lyrical content comprises one or more words occurring at a first time offset;
   comparing the one or more words in the lyrical content associated with the unidentified media content item with one or more additional words that occur at the first time offset within additional lyrical content associated with a known media content item of a plurality of known media content items;
   determining, by a processing device, based on the comparison, a lyrical similarity between the lyrical content associated with the unidentified media content item and the additional lyrical content associated with the known media content item of the plurality of known media content items; and
   identifying, by the processing device, the unidentified media content item as a cover of the known media content item based at least in part on the lyrical similarity, resulting in an identified cover-media content item.

2. The method of claim 1, wherein the lyrical content comprises one or more words that are lyrics of a musical composition.

3. The method of claim 1, wherein determining the lyrical content comprises:
   determining that the unidentified media content item comprises audio;
   analyzing the audio of the unidentified media content item to extract one or more words from the audio; and
   generating the lyrical content using the extracted one or more words, wherein the lyrical content comprises a text representation of the one or more words.

4. The method of claim 3, wherein analyzing the audio comprises performing an automatic speech recognition (ASR) operation on the audio of the unidentified media content item, wherein an output of the ASR operation is text comprising the lyrical content.

5. The method of claim 1, wherein determining the lyrical content comprises:
   determining that the unidentified media content item comprises audio;
   analyzing the audio of the unidentified media content item to extract a sequence of phonemes from the audio; and
   generating the lyrical content using the extracted sequence of phonemes, wherein the lyrical content comprises a representation of one or more phonemes in the extracted sequence of phonemes.

6. The method of claim 1, wherein determining the lyrical similarity between the lyrical content associated with the unidentified media content item and the additional lyrical content associated with the known media content item comprises:
   comparing the lyrical content associated with the unidentified media content item with the additional lyrical content associated with the known media content item; and
   generating a similarity score between the lyrical content associated with the unidentified media content item with the additional lyrical content associated with the known media content item.

7. The method of claim 6, wherein the lyrical content associated with the known media content item is stored within a repository of lyrical content for the plurality of known media content items, wherein the repository comprises an inverted index of at least one of sets of words or sets of phonemes generated from transcriptions of lyrical content associated with the plurality of known media content items.

8. The method of claim 6, wherein generating the similarity score between the lyrical content associated with the unidentified media content item and the additional lyrical content associated with the known media content item comprises:
   determining a match count by counting at least one of a) a number of words and n-grams that match between the lyrical content of the unidentified media content item and the additional lyrical content of the known media content item orb) a number of phonemes and n-grams that match between the lyrical content of the unidentified media content item and the additional lyrical content of the known media content item; and
   dividing the match count by a greater of a) a number of words or phonemes from the lyrical content of the unidentified media content item or b) a number of words or phonemes from the lyrical content of the known media content item.

9. The method of claim 1, wherein determining the lyrical similarity between the lyrical content associated with the unidentified media content item and the additional lyrical content associated with the known media content item further comprises:
   identifying the one or more words in the lyrical content associated with the unidentified media content item;
   determining that the one or more words occur at the first time offset within the lyrical content associated with the unidentified media content item; and
   generating a similarity score between the one or more words and the one or more additional words that occur at the first time offset.

10. The method of claim 1, further comprising:
    determining a set of features of the unidentified media content item;
    determining a feature similarity between the set of features of the unidentified media content item and an additional set of features associated with the known media content item;
    determining a combined similarity score based on the lyrical similarity and the feature similarity;
    determining whether the combined similarity score meets or exceeds a similarity threshold; and identifying the unidentified media content item as the cover of the known media content item responsive to determining that the combined similarity score meets or exceeds the similarity threshold.

11. The method of claim 10, wherein determining the set of features for the unidentified media content item comprises:
generating a plurality of signal-based vectors from the unidentified media content item, wherein the plurality of signal-based vectors represents at least one of pitch, timbre, or rhythm;
determining a beat of the unidentified media content item;
dividing the unidentified media content item into a plurality of segments;
for each beat in the unidentified media content item, determining a plurality of normalized signal-based vectors from the plurality of signal-based vectors for a subset of the plurality of segments; and
generating the set of features from the normalized plurality of signal-based vectors.

12. The method of claim 1, further comprising:
determining whether the lyrical similarity satisfies a similarity threshold;
responsive to determining that the lyrical similarity satisfies the similarity threshold:
determining a set of features of the unidentified media content item;
determining a feature similarity between the set of features of the unidentified media content item and an additional set of features associated with the known media content item; and
identifying the unidentified media content item as the cover of the known media content item based on the lyrical similarity and the feature similarity.

13. The method of claim 1, further comprising:
comparing the lyrical content associated with the unidentified media content item with additional lyrical content associated with two or more of the plurality of known media content items;
determining similarity values for each of the two or more of the plurality of known media content items based on the comparing, wherein a similarity value represents a similarity between the additional lyrical content associated with one of the two or more of the plurality of known media content items and the lyrical content associated with the unidentified media content item;
determining a set of known media content items having similarity values that meet or exceed a similarity threshold; and
comparing a set of features of the unidentified media content item to sets of features of each of the known media content items in the set of known media content items.

14. The method of claim 1, further comprising:
determining a publishing rights holder of the known media content item; and
determining a publishing resource allocation for the identified cover-media content item.

15. The method of claim 1, further comprising:
updating metadata of the identified cover-media content item to include cover information that identifies the identified cover-media content item as the cover of the known media content item.

16. The method of claim 1, further comprising:
dividing the unidentified media content item into a plurality of segments;
generating, for one or more segments of the plurality of segments, a respective digital fingerprint from the segment;
comparing each respective digital fingerprint to a plurality of stored digital fingerprints, wherein each of the plurality of stored digital fingerprints is associated with a respective known media content item of the plurality of known media content items;
determining, based on the comparing, that at least a threshold amount of the respective digital fingerprints of the one or more segments fail to match stored digital fingerprints of any the plurality of known media content items; and
determining that the unidentified media content item does not correspond to any of the plurality of known media content items, wherein the determining of the lyrical content associated with the unidentified media content item is performed after determining that the unidentified media content item does not correspond to any of the plurality of known media content items.

17. The method of claim 1, further comprising:
identifying a geographic location associated with the unidentified media content item based on at least one of a) the geographic location associated with a user account that uploaded the unidentified media content item orb) metadata of the unidentified media content item; and
determining one or more spoken languages associated with the geographic location;
wherein determining the lyrical content associated with the unidentified media content item comprises, for each spoken language of the one or more spoken languages associated with the geographic location, processing the unidentified media content item using a machine learning model trained to perform speech recognition on audio content comprising speech in the spoken language.

18. The method of claim 1, further comprising:
determining timing information of at least one of words or phonemes in the lyrical content associated with the unidentified media content item;
generating a first cross-similarity matrix between words or phonemes at timing offsets from the unidentified media content item and additional words or additional phonemes at additional timing offsets from the known media content item;
determining one or more musical features representing at least one of pitch, timbre or rhythm from the unidentified media content item;
generating, for at least one of the one or more musical features, an additional cross-similarity matrix between the musical features at a second set of timing offsets from the unidentified media content item and additional musical features at a second set of additional timing offsets from the known media content item;
determining a similarity score between the unidentified media content item and the known media content item based on the first cross-similarity matrix and the additional cross-similarity matrix; and
determining that the similarity score meets or exceeds a similarity threshold.

19. A non-transitory computer readable medium comprising instructions that, when executed by a processing device, cause the processing device to perform operations comprising:
receiving an unidentified media content item;

determining lyrical content associated with the unidentified media content item;

determining, by the processing device, a lyrical similarity between the lyrical content associated with the unidentified media content item and additional lyrical content associated with a known media content item of a plurality of known media content items from a media content repository;

responsive to determining that the lyrical similarity satisfies a similarity threshold;

determining one or more musical features representing at least one of pitch, timbre or rhythm from the unidentified media content item;

determining, by the processing device, a musical similarity between the one or more musical features of the unidentified media content item and the known media content item; and identifying, by the processing device, the unidentified media content item as a cover of the known media content item based on at least one of the lyrical similarity or the musical similarity, resulting in an identified cover-media content item; and responsive to determining that the lyrical similarity does not satisfy the similarity threshold, identifying the unidentified media content item as not a cover of the known media content item.

20. A system comprising:

a first computing device comprising a media content sharing platform, wherein the first computing device is to:

receive an unidentified media content item uploaded to the media content sharing platform;

determine lyrical content associated with the unidentified media content item;

determine that a lyrical similarity between the lyrical content associated with the unidentified media content item and additional lyrical content associated with a known media content item of a plurality of known media content items exceeds a similarity threshold;

responsive to determining that the lyrical similarity exceeds the similarity threshold, perform at least one of a) send the unidentified media content item to a second computing device connected to the first computing device via a network, or b) extract one or more features of the unidentified media content item and send at least one of the one or more features or the lyrical content to the second computing device; and receive, from the second computing device, a notification that the unidentified media content item is a cover of the known media content item.

21. The system of claim 20, further comprising:

the second computing device, to:

receive at least one of the unidentified media content item, the lyrical content or the one or more features;

determine an additional similarity between the one or more features of the unidentified media content item and the known media content item;

identify the unidentified media content item as the cover of the known media content item based on the lyrical similarity and the additional similarity, resulting in an identified cover-media content item; and notify the first computing device that the identified cover-media content item is the cover of the known media content item.

22. The system of claim 21, wherein determining that the lyrical similarity exceeds the similarity threshold comprises:

the first computing device sending the lyrical content to the second computing device;

the second computing device comparing the lyrical content to additional lyrical content of one or more of the plurality of known media content items;

the second computing device determining the lyrical similarity between the lyrical content associated with the unidentified media content item and the additional lyrical content associated with the known media content item;

the second computing device determining that the lyrical similarity meets or exceeds the similarity threshold; and the second computing device reporting at least one of a) the lyrical similarity or b) that the lyrical similarity meets or exceeds the similarity threshold to the first computing device.

* * * * *